United States Patent
Enomoto et al.

(10) Patent No.: US 11,780,992 B2
(45) Date of Patent: Oct. 10, 2023

(54) DIP MOLDING COMPOSITION, METHOD OF PRODUCING GLOVE, AND GLOVE

(71) Applicant: Midori Anzen Co., Ltd., Tokyo (JP)

(72) Inventors: Norihide Enomoto, Tokyo (JP); Taichi Ogawa, Tokyo (JP)

(73) Assignee: Midori Anzen Co., Ltd., Tokyo (JP)

( * ) Notice: Subject to any disclaimer, the term of this patent is extended or adjusted under 35 U.S.C. 154(b) by 269 days.

(21) Appl. No.: 16/618,874

(22) PCT Filed: Jun. 25, 2019

(86) PCT No.: PCT/JP2019/025226
§ 371 (c)(1),
(2) Date: Dec. 3, 2019

(87) PCT Pub. No.: WO2020/004415
PCT Pub. Date: Jan. 2, 2020

(65) Prior Publication Data
US 2021/0179820 A1   Jun. 17, 2021

(30) Foreign Application Priority Data
Jun. 27, 2018 (JP) .................. 2018-122417

(51) Int. Cl.
*C08L 9/02* (2006.01)
*A41D 19/00* (2006.01)
(Continued)

(52) U.S. Cl.
CPC .......... *C08L 9/02* (2013.01); *A41D 19/0055* (2013.01); *A41D 19/04* (2013.01); *B29C 41/003* (2013.01);
(Continued)

(58) Field of Classification Search
None
See application file for complete search history.

(56) References Cited

U.S. PATENT DOCUMENTS

| 9,243,117 B2 * | 1/2016 | Khoo | C08J 5/02 |
| 2009/0105424 A1 * | 4/2009 | Kodama | B29C 41/14 |
| | | | 525/331.9 |

(Continued)

FOREIGN PATENT DOCUMENTS

| CA | 2558901 A1 | 3/2007 |
| CN | 106103570 A | 11/2016 |

(Continued)

OTHER PUBLICATIONS

WO-2016013666-A1, Jan. 2016 (Year: 2016).*

(Continued)

*Primary Examiner* — Satya B Sastri
(74) *Attorney, Agent, or Firm* — MARSHALL, GERSTEIN & BORUN LLP

(57) ABSTRACT

Provided is, a glove production method including: (1) the step of immersing a glove forming mold in a liquid coagulant containing calcium ions so as to allow the coagulant to adhere to the glove forming mold; (2) the dispersion step of leaving a dip molding composition to stand with stirring; (3) the dipping step; (4) the gelling step; (5) the leaching step; (6) the beading step; (7) the precuring step; and (8) the curing step, in which method the steps (3) to (8) are performed in the order mentioned, and the dip molding composition has a specific formulation.

7 Claims, 5 Drawing Sheets

(51) Int. Cl.
    *A41D 19/04*     (2006.01)
    *B29C 41/00*     (2006.01)
    *B29C 41/14*     (2006.01)
    *B29C 41/46*     (2006.01)
    *B29C 71/02*     (2006.01)
    *C08K 3/20*     (2006.01)
    *C08L 33/02*     (2006.01)
    *B29K 9/00*     (2006.01)
    *B29K 33/20*     (2006.01)
    *B29K 79/00*     (2006.01)
    *C08L 79/08*     (2006.01)

(52) U.S. Cl.
    CPC ............. *B29C 41/14* (2013.01); *B29C 41/46* (2013.01); *B29C 71/02* (2013.01); *C08K 3/20* (2013.01); *C08L 33/02* (2013.01); *B29K 2009/00* (2013.01); *B29K 2033/20* (2013.01); *B29K 2079/085* (2013.01); *C08L 79/08* (2013.01)

(56) References Cited

U.S. PATENT DOCUMENTS

| | | | |
|---|---|---|---|
| 2013/0191964 A1 | 8/2013 | Khoo et al. | |
| 2015/0010745 A1 | 1/2015 | Chieng et al. | |
| 2015/0218352 A1* | 8/2015 | Enomoto | C08K 5/0025 2/168 |
| 2017/0015819 A1 | 1/2017 | Enomoto et al. | |
| 2018/0371237 A1* | 12/2018 | Tsukamoto | C08G 18/283 |
| 2019/0161601 A1 | 5/2019 | Enomoto et al. | |
| 2019/0174848 A1 | 6/2019 | Enomoto et al. | |

FOREIGN PATENT DOCUMENTS

| | | | | |
|---|---|---|---|---|
| JP | H08-207171 | | 8/1996 | |
| JP | 2005-307163 | A | 11/2005 | |
| JP | 2013-203914 | A | 10/2013 | |
| JP | 2015-513486 | A | 5/2015 | |
| JP | 2015-187227 | A | 10/2015 | |
| JP | 2018187227 | A * | 11/2018 | ............... A61B 6/00 |
| KR | 2015057092 | A * | 5/2015 | ............... C08F 2/38 |
| KR | 20150057092 | A * | 5/2015 | |
| KR | 10-1687866 | B1 | 12/2016 | |
| RU | 2637243 | C2 | 12/2017 | |
| TW | 201420617 | A | 6/2014 | |
| WO | WO-2016013666 | A1 * | 1/2016 | ............. A41D 19/00 |
| WO | WO-2017/217542 | A1 | 12/2017 | |
| WO | WO-2017217542 | A1 * | 12/2017 | ......... A41D 19/0055 |
| WO | WO-2018/117109 | A1 | 6/2018 | |

OTHER PUBLICATIONS

KR-20150057092-A, May 2015, Derwent Ab. (Year: 2015).*
WO-2017217542-A1, Dec. 2017, Machine translation (Year: 2017).*
JP-2018187227-A, Nov. 2018, Machine translation (Year: 2018).*
KR-2015057092-A,, May 2015 (Year: 2015).*
Office Action in CN Application No. 201980003409.X dated Jul. 20, 2021, 22 pages.
Yasuharu Nakayama, "Crosslinking Reaction Handbook", Published by Maruzen Publishing Co., Ltd., Jul. 30, 2013, p. 265, with partial translation.
W. Posthumus et al., "Crosslinking by Polycarbodiimides", Progress in Organic Coatings, 58, 2007, pp. 231-236.
"Reaction Mechanism of Aqueous-type Carbodilite", Control of Reaction and Structure of Crosslinks, Edited by Chiharu Terada, published by Technical Information Instituted Co., Ltd., Jan. 31, 2014, p. 105, with partial translation.
Search Report and Written Opinion International Application No. PCT/JP2019025226 dated Sep. 17, 2019, 7 pages.
Office Action in RU Application No. 2019137085 dated Jun. 28, 2021, 20 pages.
Office Action in Taiwan Application No. 108122510 dated Apr. 13, 2020, 12 pages.
Office Action in JP Application No. 2020-188772 filed May 9, 2023, 7 pages.
Nisshinbo Chemical Inc., Carbodiimide Crosslinkers for Waterborne Resins, online search date Apr. 19, 2023, https://www.nisshinbo-chem.co.jp/products/carbodilite/water.html, 10 pages.

* cited by examiner

DIP MOLDING COMPOSITION, METHOD OF PRODUCING GLOVE, AND GLOVE

TECHNICAL FIELD

The present invention relates to: a dip molding composition; a method of producing a glove; and a glove.

BACKGROUND ART

Conventionally, technologies for producing a glove by a dip molding method using a carboxylated acrylonitrile-butadiene copolymer (hereinafter, also referred to as "XNBR") along with a polycarbodiimide as an organic crosslinking agent include those described in Patent Documents 1 to 6. A glove obtained through crosslinking using a polycarbodiimide is hereinafter referred to as "polycarbodiimide-crosslinked glove".

Conventional rubber gloves that are crosslinked using sulfur along with a sulfur-based vulcanization accelerator such a thiraum mix or a thiazole cause type IV allergy; therefore, accelerator free-gloves that replace such rubber gloves have been studied. The technologies described in Patent Documents 1 to 6 utilize covalent bonds formed by reaction of a polycarbodiimide.

In these Patent Documents, for the production of a polycarbodiimide-crosslinked glove, ammonium hydroxide is used as a pH modifier in place of potassium hydroxide (KOH) that is generally used in the XNBR glove production using a conventional sulfur-based crosslinking agent.

Particularly, in Patent Documents 5 and 6, it is a requirement to use ammonium hydroxide as a pH modifier. The reason for this is because it was believed necessary to use a volatile base, such as ammonia, as a pH modifier in crosslinking of a polycarbodiimide with carboxyl groups.

Patent Document 3 describes examples where 1-ethyl-3-(3-dimethylaminopropyl)carbodiimide (EDC) was added at the time of producing a dip molding composition containing a potassium hydroxide solution, and a dip-molded product was obtained using the resulting dip molding composition. However, EDC has only one carbodiimide group and thus does not correspond to a polycarbodiimide compound; therefore, it is believed that the use of EDC does not induce a crosslinking reaction.

Further, as an example of using a polycarbodiimide compound, Patent Document 3 describes an example where a polycarbodiimide compound was added at the time of producing a carboxylic acid-modified nitrile-based copolymer latex composition, i.e. at the time of synthesizing a carboxylic acid-modified nitrile-based copolymer. However, it is believed that the polycarbodiimide compound was only utilized as a crosslinking agent of a carboxylic acid-modified nitrile-based copolymer and thus not involved in a crosslinking reaction for the production of a dip-molded product.

A crosslinking reaction between a carboxyl group of an XNBR and a polycarbodiimide is summarized below.

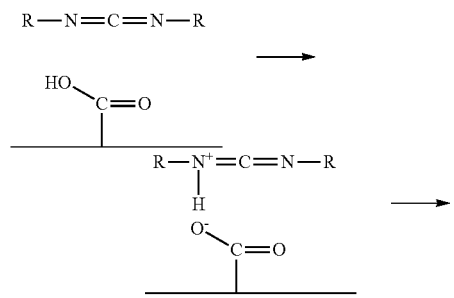

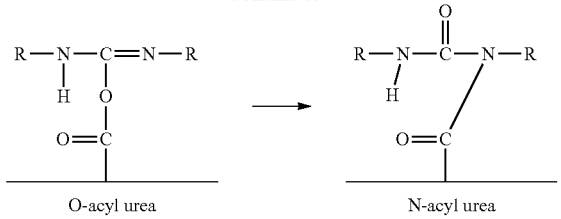

O-acyl urea      N-acyl urea

As in the formula above, for the initiation of the reaction, the polycarbodiimide needs to abstract $H^+$ from the carboxyl group (—COOH) of the XNBR and thereby bring the carboxyl group into a free state. As described below, actual crosslinking of a polycarbodiimide-crosslinked glove takes place in the curing step. In this step, most of carboxyl groups of the XNBR normally form salts with calcium derived from a coagulant and a metal crosslinking agent such as zinc. The polycarbodiimide can start to crosslink only with the remaining carboxyl groups of the XNBR.

When ammonium hydroxide is used as a pH modifier, ammonia forming an ammonium salt (—COO—$NH_4^+$) with the XNBR is volatilized and the salt is converted back to a carboxyl group (—COOH), whereby carboxyl groups capable of crosslinking with the polycarbodiimide are secured.

Meanwhile, when potassium hydroxide is used as a pH modifier, it forms a potassium salt (—COOK) with the XNBR and thus cannot crosslink with the polycarbodiimide. It is believed that, as a result, a sufficient amount of carboxyl groups to be crosslinked with the polycarbodiimide are not ensured.

Conventionally, polycarbodiimides have been used as crosslinking agents of aqueous paints. The use of a polycarbodiimide as an aqueous paint is also based on the reaction between carboxyl groups and the polycarbodiimide. The crosslinking reaction in the production of a polycarbodiimide-crosslinked glove is different from the crosslinking reaction in an aqueous paint in terms of crosslinking temperature and the like; however, these crosslinking reactions are carried out under the substantially the same conditions, for example, in a neutral pH environment.

In other words, it is necessary to adjust the pH to be weakly acidic to neutral for crosslinking a carboxyl group-containing aqueous paint with carbodiimide groups and, with regard to a pH modifier to be used in this process, Non-patent Document 1 states "crosslinking of a coating film does not proceed when the coating film is neutralized with sodium; however, crosslinking of a coating film neutralized with ammonia, triethylamine or the like proceeds at normal temperature".

As for a pH modifier in a reaction between a polycarbodiimide and a carboxylic functional polymer, Non-patent Document 2 states "it is a common sense to use a volatile base". Further, with regard to the pH modifier, it is stated "The reaction does not proceed when NaOH is added to a CHDA/polycarbodiimide mixed solution. This indicates that a deprotonated carboxyl group is not reactive with a carbodiimide group"; however, it is also stated "The reaction proceeds with an addition of triethylamine that is a volatile base, and this is easily explained by the fact that carboxyl groups are deprotonated initially but protonated again as the base volatilizes".

Non-patent Document 3 describes aqueous-type "CARBODILITE" manufactured by Nisshinbo Chemical Inc. In this Document, it is stated as follows: "The reaction with an aqueous paint is the reaction of carboxyl groups (—COOH) and their amine salts that are contained in the main agent of the paint with carbodiimide groups (—N=C=N—) contained in 'CARBODILITE'" and " . . . does not react with a metal salt of a carboxyl group (—COONa) even when heated".

In Patent Documents 5 and 6, for example, special production methods required for producing gloves by dip molding using a polycarbodiimide along with ammonium hydroxide as a pH modifier were discovered. The characteristic features of the inventions disclosed in these documents are described below.

A first characteristic feature is that a polycarbodiimide, by incorporating thereto a hydrophilic segment, is prevented from being deactivated even in water until the curing step, and the hydrophilic segment is opened by drying in the curing step to initiate a crosslinking reaction. In order to achieve this, although drying in the gelling step is performed at a relatively high temperature in conventional glove production, it is necessary to adopt conditions where gelling is performed without drying when crosslinking the polycarbodiimide.

With regard to ammonium hydroxide used as a pH modifier, it forms ammonium salts (—COO—$NH_4^+$) with the carboxyl groups of an XNBR; however, since the ammonium salts are degraded by heating and ammonia is consequently volatilized, it is necessary to avoid a high temperature particularly in the gelling step.

A second characteristic feature is attributed to that the polycarbodiimide can crosslink only with the carboxyl groups (—COOH) of the XNBR. In the glove production, most of the carboxyl groups of the XNBR form metal salts with calcium, zinc and the like during curing; however, —COO—$NH_4^+$ is degraded by heating to volatilize ammonia while being converted into a carboxyl group (—COOH), whereby carboxyl groups to be crosslinked with the polycarbodiimide are secured.

In contrast, the method and conditions for the production of a polycarbodiimide-crosslinked glove using ammonium hydroxide as a pH modifier are generally the same as, but different in details form those for the production of an XNBR glove using a conventional sulfur-based vulcanization accelerator. Accordingly, the production equipments, the production conditions and know-how of glove manufactures that have been established on the premise of producing XNBR gloves using a conventional sulfur-based vulcanization accelerator are different, and changes have not been easily accepted. Particularly, it has been gradually understood that, since ammonium hydroxide is a volatile substance, it is difficult to control the pH, and a reduction in the pH during dipping leads to a reduction in the tensile strength and the fatigue durability of the resulting gloves. In addition, with regard to the temperature conditions for gelling, it is necessary to not only change the conditions due to the properties of polycarbodiimides but also set conditions such that volatilization of ammonia is inhibited as much as possible. There are also problems of the irritating odor of ammonia and potential corrosion of the equipments. Moreover, there is a strong demand from manufactures for utilization of the accumulated technologies and know-how of conventional glove production, except for the changes in the production conditions due to the properties of polycarbodiimides.

RELATED ART DOCUMENTS

Patent Documents

[Patent Document 1] Japanese Unexamined Patent Application Publication (Translation of PCT Application) No. 2015-513486
[Patent Document 2] Japanese Unexamined Patent Application Publication No. 2013-203914
[Patent Document 3] Korean Patent No. 10-1687866
[Patent Document 4] Japanese Unexamined Patent Application Publication No. 2015-187227
[Patent Document 5] WO 2017/217542
[Patent Document 6] WO 2018/117109

Non-Patent Documents

[Non-patent Document 1] Crosslinking Reaction Handbook, Yasuharu Nakayama, Jul. 30, 2013, published by Maruzen Publishing Co., Ltd., page 265
[Non-patent Document 2] W. Posthumus et al., Progress in Organic Coatings 58 (2007), 231-236
[Non-patent Document 3] Control of Reaction and Structure of Crosslinks, Jan. 31, 2014, edited by Chiharu Terada, published by Technical Information Instituted Co., Ltd., page 105

SUMMARY OF THE INVENTION

Problems to be Solved by the Invention

In the XNBR glove production methods in which sulfur-based crosslinking agents have been used over the years, the existing equipments, processes and production conditions have been integrally formed based on the vast accumulation of technologies, and alkali metal hydroxides have been used as pH modifiers under such circumstance.

Meanwhile, the present invention is aimed at enabling to produce a glove having the desired performance with the use of an alkali metal hydroxide as a pH modifier in the production of a polycarbodiimide-crosslinked glove, which was not thinkable in the conventional wisdom.

Means for Solving the Problems

That is, the present invention relates to the followings.
[1] A dip molding composition containing, at least:
an elastomer that contains a (meth)acrylonitrile-derived structural unit, an unsaturated carboxylic acid-derived structural unit, and a butadiene-derived structural unit in a polymer main chain;
a polycarbodiimide;
an alkali metal hydroxide; and
water,
wherein
the elastomer contains the (meth)acrylonitrile-derived structural unit in an amount of 20 to 40% by weight, the unsaturated carboxylic acid-derived structural unit in an amount of 1 to 10% by weight, and the butadiene-derived structural unit in an amount of 50 to 75% by weight,
the polycarbodiimide includes at least one polycarbodiimide containing a hydrophilic segment in its molecular structure, and is added in an amount of larger than 0.2% by weight but 4.0% by weight or less with respect to a total solid content of the dip molding composition, and
the dip molding composition has a pH of 9.5 to 10.5.

[2] The dip molding composition according to [1], containing zinc oxide and/or an aluminum complex as a metal crosslinking agent in an amount of 0.2 to 7.0% by weight with respect to the total solid content of the dip molding composition.

[3] The dip molding composition according to [1] or [2], wherein the alkali metal hydroxide is potassium hydroxide.

[4] The dip molding composition according to any one of [1] to [3], wherein the number of carbodiimide functional groups is 5 or more per molecule of the polycarbodiimide, and micelles formed from the polycarbodiimide have an average particle size of 5 to 30 nm.

[5] A method of producing a glove, the method including:
(1) a step of allowing a coagulant containing calcium ions to adhere to a glove forming mold;
(2) a dispersion step of stirring a dip molding composition;
(3) a dipping step of immersing the glove forming mold, to which the coagulant has adhered in the step (1), in the dip molding composition so as to allow the dip molding composition to aggregate and adhere to the glove forming mold;
(4) a gelling step of leaving the glove forming mold, to which the dip molding composition has adhered, to stand at a temperature of 40 to 120° C. for 20 seconds to 4 minutes so as to form a cured film precursor on the glove forming mold;
(5) a leaching step of washing the cured film precursor thus formed on the glove forming mold with 40 to 70° C. water for 1.5 minutes to 4 minutes;
(6) a beading step of making a roll in a cuff portion of the resulting glove; and
(7) a curing step of heating and drying the cured film precursor subjected to the beading step at 100 to 140° C. for 15 to 30 minutes so as to obtain a cured film,
wherein
the steps (3) to (7) are performed in the order mentioned, and
the dip molding composition is the dip molding composition according to any one of [1] to [4].

[6] The method of producing a glove according to [5], wherein the steps (3) and (4) are performed at least twice.

[7] A glove produced by the method according to [5] or [6], the glove having a total content of potassium and calcium of 1.15% or less by weight at a film thickness of 50 to 100 μm.

[8] The glove according to [7], having a tensile strength of 20 MPa or higher as determined by an ASTM test method and exhibiting a fatigue durability of 240 minutes or longer in a fatigue durability test.

Effects of the Invention

According to the present invention, a glove that exhibits excellent fatigue durability without generating the irritating odor of ammonia or causing corrosion of equipments can be produced by using an alkali metal hydroxide as a pH modifier in the production of a polycarbodiimide-crosslinked glove, which was not considered in the common sense of the conventional crosslinking technology.

MODE FOR CARRYING OUT THE INVENTION

1. Dip Molding Composition

Figure 1A:
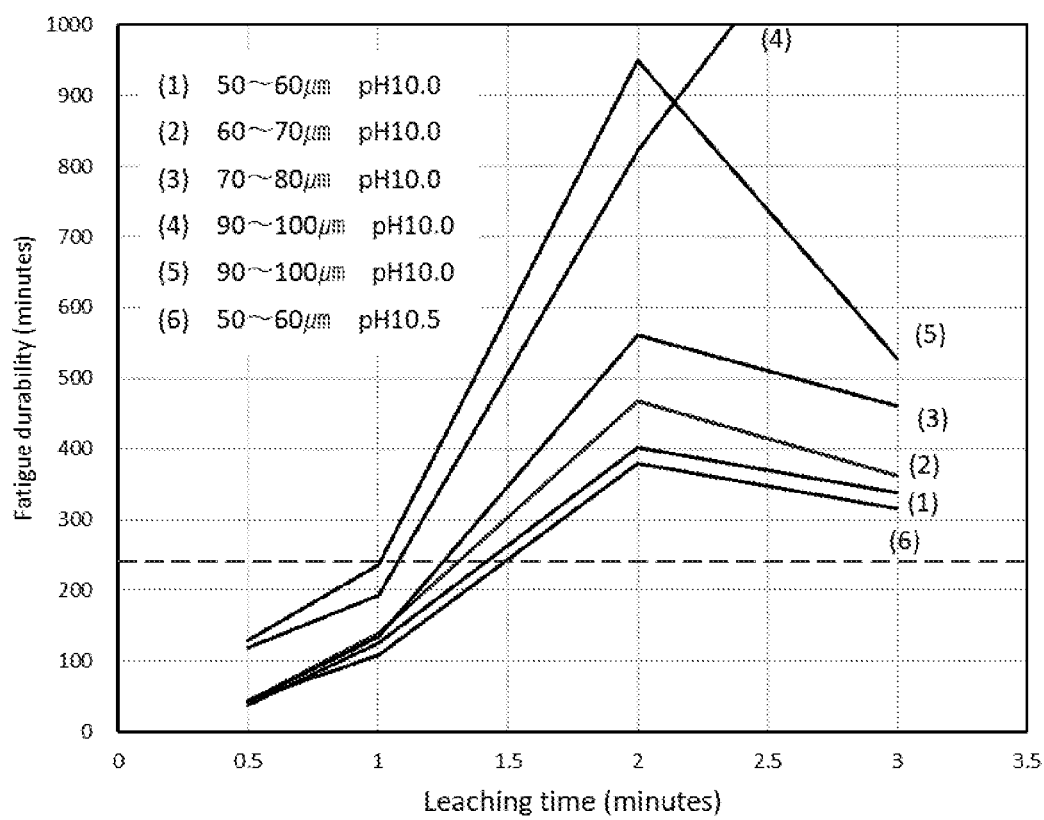
FIG. 1A is a graph showing the relationships between the leaching time and the fatigue durability of cured films at a leaching temperature of 50° C.
Figure 1B:
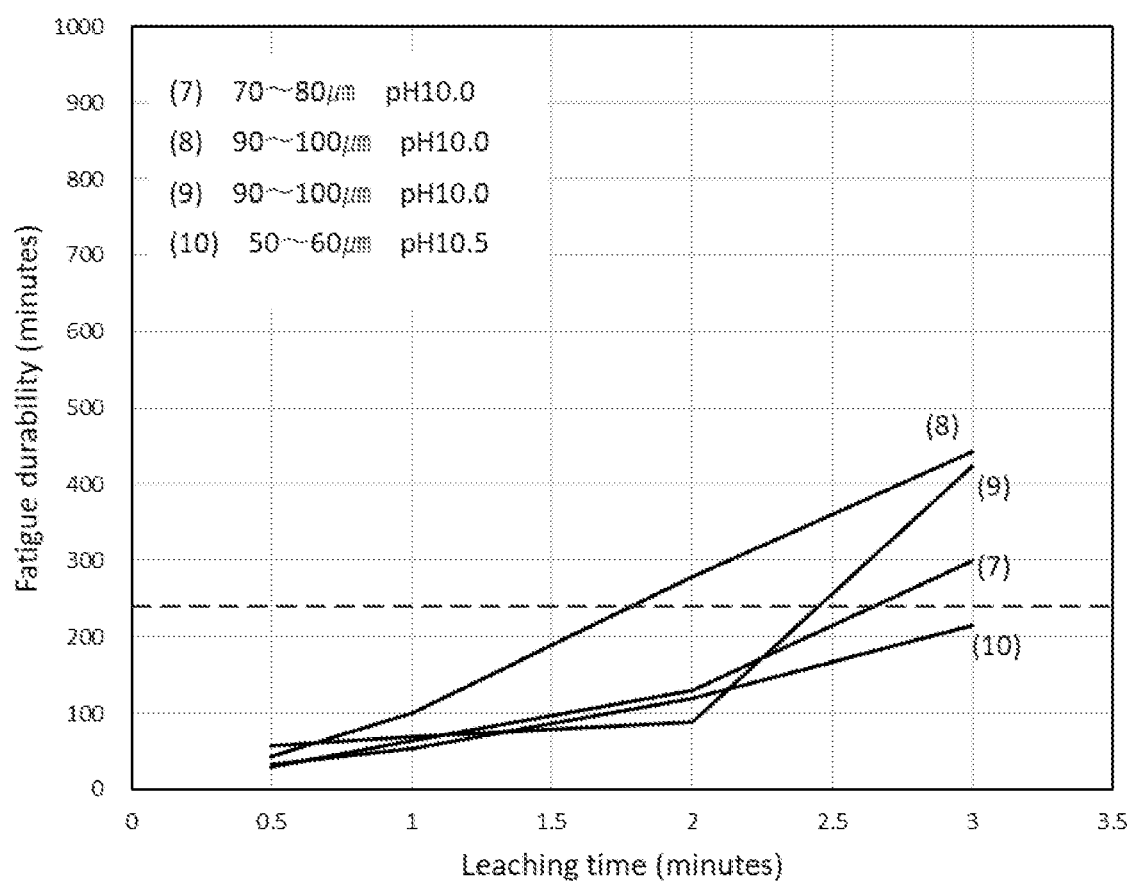
FIG. 1B is a graph showing the relationships between the leaching time and the fatigue durability of cured films at a leaching temperature of 23° C.

The dip molding composition according to one embodiment of the present invention is mainly used as a dipping liquid serving as a raw material of a glove. The dip molding composition is a composition containing: an elastomer that contains a (meth)acrylonitrile-derived structural unit, an unsaturated carboxylic acid-derived structural unit, and a butadiene-derived structural unit in a polymer main chain; a polycarbodiimide containing a hydrophilic segment in its molecular structure; an alkali metal hydroxide; and water.

The dip molding composition may further contain, as an optional component(s), other component(s) such as a metal crosslinking agent, and the present specification also describes such a dip molding composition containing a metal crosslinking agent.

In addition to the use for molding gloves, the dip molding composition according to one embodiment of the present invention can also be used for molding, for example, medical goods, such as nursing bottle nipples, droppers, conduits, and water pillows; toys and sporting equipments, such as balloons, dolls, and balls; industrial articles, such as bags for press molding and bags for gas storage; and dip-molded articles, such as gloves and fingerstalls for surgical use, domestic use, agricultural use, fishery use and industrial use.

(1) Latex of Carboxylated Acrylonitrile-Butadiene Elastomer

This latex is an emulsion in which polymer particles (micelles) of 50 to 250 nm in diameter, which are formed in a domain of an emulsifier such as dodecylbenzenesulfonic acid by emulsion polymerization of acrylonitrile, butadiene and a carboxylic acid and enclosed in a film of the emulsifier, are dispersed. The outside of the film is hydrophilic, while the inside of the film is hydrophobic. In the particles, carboxyl groups are oriented toward the inside.

The above-described latex contains water and the above-described elastomer as a solid component. This elastomer contains, at least, a (meth)acrylonitrile-derived structural unit, an unsaturated carboxylic acid-derived structural unit and a butadiene-derived structural unit in a polymer main chain. This elastomer may also be hereinafter simply referred to as "XNBR". The term "(meth)acrylonitrile" is a concept that encompasses both "acrylonitrile" and "methacrylonitrile".

With regard to the ratios of these structural units, the elastomer used in one embodiment of the present invention preferably contains: the (meth)acrylonitrile-derived structural unit, namely a (meth)acrylonitrile residue, in a range of 20 to 40% by weight; the unsaturated carboxylic acid-derived structural unit, namely an unsaturated carboxylic acid residue, in a range of 1 to 10% by weight; and the butadiene-derived structural unit, namely a butadiene residue, in a range of 50 to 75% by weight.

The ratios of these structural units can be simply determined from the weight ratios (solid content ratios) of the respective raw materials used for producing the elastomer used in one embodiment of the present invention.

The (meth)acrylonitrile-derived structural unit is an element that mainly imparts strength to a glove, and an excessively small amount thereof leads to insufficient strength, whereas an excessively large amount thereof improves the chemical resistance but makes the glove overly hard. The ratio of the (meth)acrylonitrile-derived structural unit in the elastomer is 20 to 40% by weight, preferably 25 to 40% by weight. In conventional XNBR gloves, the ratio of the (meth)acrylonitrile-derived structural unit was usually 25 to 30% by weight; however, XNBRs that not only have a high strength by containing 30% by weight or more of a (meth)acrylonitrile-derived structural unit but also exhibit good elongation have been developed in recent years, and such XNBRs are effective in the production of ultra-thin gloves. The amount of the (meth)acrylonitrile-derived structural unit can be determined by converting the amount of nitrogen atoms, which is determined by elemental analysis, into the amount of nitrile groups.

The butadiene-derived structural unit is an element that imparts flexibility to a rubber glove and, usually, the flexibility is lost when the ratio of this structural unit is lower than 50% by weight. The ratio of the butadiene-derived structural unit in the elastomer used in one embodiment of the present invention is more preferably 60 to 75% by weight.

In a conventional sulfur crosslinking model, sulfur and butadiene are covalently bound and carboxyl groups of unsaturated carboxylic acid-derived structural units ionically bind with a metal crosslinking agent to increase the tensile strength; however, in the present invention, carboxyl groups form covalent bonds with the polycarbodiimide and thereby mainly contribute to an increase in the fatigue durability. Further, when a metal crosslinking agent is used, the metal crosslinking agent ionically binds with the carboxyl groups and thereby form a crosslinked structure that contributes to an increase in the tensile strength. Calcium derived from the below-described coagulant also forms a crosslinked structure with a considerable portion of the carboxyl groups.

Moreover, when, as in one embodiment of the present invention, an alkali metal hydroxide is used as a pH modifier in place of volatile ammonia or amine compound that has been regarded as an essential component in conventional polycarbodiimide-crosslinked gloves, for example, sodium and potassium also bind with carboxyl groups; therefore, it is an important problem to secure carboxyl groups that crosslink with the polycarbodiimide.

In order to maintain the physical properties of a rubber glove as a final product having an appropriate amount of crosslinked structures, the amount of the unsaturated carboxylic acid-derived structural unit is preferably 1 to 10% by weight, more preferably 4 to 6% by weight, in the elastomer used in one embodiment of the present invention. The amount of the unsaturated carboxylic acid-derived structural unit can be determined by quantifying carboxyl groups and carboxyl group-derived carbonyl groups by infrared (IR) spectroscopy or the like.

In polycarbodiimide-crosslinked gloves, a coagulant-derived calcium, a pH modifier-derived alkali metal, and a metal crosslinking agent (if used) compete with each other in crosslinking with a polycarbodiimide; therefore, the larger the amount of the unsaturated carboxylic acid-derived structural unit in the elastomer, the more preferred it is.

The unsaturated carboxylic acid forming the unsaturated carboxylic acid-derived structural unit is not particularly restricted, and can be a monocarboxylic acid or a polycarboxylic acid. More specific examples of the unsaturated carboxylic acid include acrylic acid, methacrylic acid, crotonic acid, maleic acid, and fumaric acid. Thereamong, acrylic acid and/or methacrylic acid (hereinafter, collectively referred to as "(meth)acrylic acid") is preferably used, and methacrylic acid is more preferably used.

The butadiene-derived structural unit is preferably a structural unit derived from 1,3-butadiene.

It is preferred that the polymer main chain be substantially constituted by the (meth)acrylonitrile-derived structural unit, the unsaturated carboxylic acid-derived structural unit and the butadiene-derived structural unit; however, the polymer main chain can also contain a structural unit derived from other polymerizable monomer.

In the elastomer used in one embodiment of the present invention, the structural unit derived from other polymerizable monomer is contained in an amount of preferably not greater than 30% by weight, more preferably not greater than 20% by weight, still more preferably not greater than 15% by weight.

In the present invention, the amount of acrylonitrile (AN) residues and that of unsaturated carboxylic acid (MMA) residues can be quantified by the following method.

Each elastomer (XNBR) is dried to prepare a film. This film is analyzed by FT-IR to measure the absorbance (Abs) at an absorption wavelength of 2,237 cm$^{-1}$, which is attributed to acrylonitrile groups, and the absorbance (Abs) at an absorption wavelength of 1,699 cm$^{-1}$, which is attributed to carboxylate groups, so as to determine the amount of acrylonitrile (AN) residues and that of unsaturated carboxylic acid (MMA) residues.

The amount of acrylonitrile residues (%) is determined from a calibration curve prepared in advance. The calibration curve is prepared using samples that are obtained by adding a polyacrylic acid as an internal standard substance to each elastomer and have a known amount of acrylonitrile groups. The amount of unsaturated carboxylic acid residues is calculated by the following equation:

Amount of unsaturated carboxylic acid residues (% by weight)=[Abs(1,699 cm$^{-1}$)/Abs(2,237 cm$^{-1}$)]/0.2661

In this equation, the coefficient of 0.2661 is a value calculated from a calibration curve prepared using plural samples each having a known ratio of unsaturated carboxylate groups and acrylonitrile groups.

Examples of other polymerizable monomer that can be preferably used include aromatic vinyl monomers, such as styrene, α-methyl styrene, and dimethyl styrene; ethylenically unsaturated carboxylic acid amides, such as (meth)acrylamide and N,N-dimethylacrylamide; ethylenically unsaturated carboxylic acid alkyl ester monomers, such as methyl (meth)acrylate, ethyl (meth)acrylate, butyl (meth)acrylate, and 2-ethylhexyl (meth)acrylate; and vinyl acetate. These monomers can be used singly, or in any combination of two or more thereof.

The elastomer used in one embodiment of the present invention can be prepared by emulsion-polymerizing, in accordance with a conventional method, an unsaturated carboxylic acid (e.g., (meth)acrylonitrile or (meth)acrylic acid), a butadiene (e.g., 1,3-butadiene) and, as required, other polymerizable monomer(s), using an emulsifier, a polymerization initiator, a molecular weight modifier and the like that are normally used. In this emulsion polymerization, water is incorporated in such an amount that attains a solid content of preferably 30 to 60% by weight, more preferably 35 to 55% by weight.

After the synthesis of the elastomer used in one embodiment of the present invention, the resulting emulsion polymerization solution can be directly used as an elastomer component of the dip molding composition.

The emulsifier has a hydrophobic group and a hydrophilic group as a surfactant and, in its domain, forms a film that surrounds particles in a latex, with the inside of the particles being hydrophobic.

In this process, the molecules of the polycarbodiimide are protected by hydrophilic segment and exist in water. Therefore, in order to induce crosslinking reactions in the final curing step, it is necessary not only to orient the carboxyl groups of the elastomer on the outside of the particles using a pH modifier but also to remove the film of the emulsifier as much as possible, thereby preparing an environment where the polycarbodiimide and a metal crosslinking agent added as required are likely to crosslink with each other.

Examples of the emulsifier include anionic surfactants, such as dodecylbenzenesulfonates and aliphatic sulfonates; and nonionic sulfonates, such as polyethylene glycol alkyl ethers and polyethylene glycol alkyl esters, and an anionic surfactant is preferably used.

The polymerization initiator is not particularly restricted as long as it is a radical initiator, and examples thereof include inorganic peroxides, such as ammonium persulfate and potassium superphosphate; organic peroxides, such as t-butyl peroxide, cumene hydroperoxide, p-menthane hydroperoxide, t-butylcumyl peroxide, benzoyl peroxide, 3,5,5-trimethylhexanoyl peroxide, and t-butyl peroxyisobutyrate; and azo compounds, such as azobisisobutyronitrile, azobis-2,4-dimethyl valeronitrile, azobiscyclohexane carbonitrile, and methyl azobisisobutyrate.

Examples of the molecular weight modifier include mercaptans, such as t-dodecylmercaptan and n-dodecylmercaptan; and halogenated hydrocarbons, such as carbon tetrachloride, methylene chloride and methylene bromide, among which mercaptans such as t-dodecylmercaptan and n-dodecylmercaptan are preferred.

The characteristics of a preferred elastomer used in the polycarbodiimide-crosslinked glove according to one embodiment of the present invention will now be described.
<Selection of Elastomer Based on Mooney Viscosity (ML$_{(1+4)}$ (100° C.))>

In the glove, a considerable portion of the carboxyl groups of the elastomer excluding the parts crosslinked by various crosslinking agents is crosslinked with calcium that is a coagulant (when a coagulant containing calcium ions is used). In a case where no metal crosslinking agent is used, the tensile strength is maintained by this calcium crosslinking.

It is known that the tensile strength attributed to the presence of calcium crosslinks is substantially proportional to the Mooney viscosity of the elastomer. When crosslinking is not performed with the polycarbodiimide, the use of an elastomer having a Mooney viscosity of 80 gives a tensile strength of about 15 MPa in the resulting glove, while the use of an elastomer having a Mooney viscosity of 100 gives a tensile strength of about 20 MPa. Therefore, it is preferred to select an elastomer having a Mooney viscosity of about 100 to 150.

The upper limit of the Mooney viscosity is about 220 since the measurement limit of the Mooney viscosity itself is 220 and an excessively high Mooney viscosity causes a problem in moldability. Meanwhile, a sufficient tensile strength cannot be attained when an elastomer having an excessively low Mooney viscosity is used.

In the present invention, the Mooney viscosity is measured by the following method.
<Mooney Viscosity Measurement Method>

To 200 ml of a saturated aqueous solution of a 4:1 mixture of calcium nitrate and calcium carbonate in a state of being stirred at room temperature, each elastomer (XNBR) latex is added dropwise using a pipette to precipitate a solid rubber. The thus precipitated solid rubber is taken out and repeatedly washed 10 times in about 1 L of ion-exchanged water with stirring, after which the solid rubber is dehydrated by squeezing and subsequently vacuum-dried (60° C., 72 hours), whereby a measurement rubber sample is prepared. The thus obtained measurement rubber sample is passed through 6-inch rolls having a roll temperature of 50° C. and a roll spacing of about 0.5 mm several times until the rubber is settled, and the Mooney viscosity of this rubber sample is measured at 100° C. using a large-diameter rotator in accordance with JIS K6300-1:2001 "Rubber, Unvulcanized—Physical Property—Part 1: Determination of Mooney viscosity and pre-vulcanization characteristics with Mooney viscometer".
<Linear Elastomer with Small Amount of Branched Chains>

Sulfur can easily infiltrate into XNBR particles and form intra-particle crosslinks. Further, when the film of the emulsifier is broken, sulfur can form inter-particle crosslinks as well. On the other hand, in the dip molding composition, since the polycarbodiimide existing in a hydrophilic region has a large molecular weight and are thus not easily incorporated into the particles, it is believed that the polycarbodiimide basically forms multi-point crosslinks between the particles. In addition, from good fatigue durability of the resulting cured film, it is believed that crosslinking takes place within the XNBR particles during the curing step of the production method. Accordingly, in the present invention using a polycarbodiimide, in order to allow the polycarbodiimide to be readily incorporated into the elastomer particles, it is preferred to use a linear elastomer having only a small amount of branched chains.

As for a method of producing an elastomer having a small amount of branched chains, various efforts have been made by latex manufacturers. For example, a cold rubber having a low polymerization temperature (polymerization temperature: 5 to 25° C.) is believed to be more preferred than a hot rubber (polymerization temperature: 25 to 50° C.).
<Gel Fraction (MEK-Insoluble Content) of Elastomer>

In the elastomer used in one embodiment of the present invention, the smaller the gel fraction, the more preferred it is.

The methyl ethyl ketone (MEK)-insoluble content is measured to be preferably 40% by weight or less, more preferably 10% by weight or less. It is noted here that the MEK-insoluble content is not correlated with the tensile strength, such as Mooney viscosity. In the present invention, the MEK-insoluble content is determined by the following method.

The MEK (methyl ethyl ketone)-insoluble (gel) component can be measured as follows. An XNBR latex dry sample in an amount of 0.2 g is placed in a mesh basket (80-mesh) whose weight has been measured, and the whole basket is immersed into 80 mL of MEK solvent in a 100-mL beaker. The beaker is subsequently capped with Parafilm and left to stand for 24 hours in a draft. Thereafter, the mesh basket is taken out of the beaker, hung inside the draft, and dried for 1 hour. After vacuum-drying the basket at 105° C. for 1 hour, the weight thereof is measured, and the post-immersion weight of the XNBR latex dry sample is determined by subtracting the weight of the basket from the thus measured weight.

The content ratio of the MEK-insoluble component (insoluble content) is calculated by the following equation:

Content ratio of insoluble component (% by weight)=(Post-immersion weight (g)/Pre-immersion weight (g))×100

The XNBR latex dry sample is prepared as follows. That is, in a 500-mL bottle, an XNBR latex of interest is stirred for 30 minutes at a rotation speed of 500 rpm, and 14 g of the latex is subsequently weighed on a 180 mm×115 mm stainless-steel vat and dried for 5 days at a temperature of 23° C.±2° C. and a humidity of 50±10 RH % to prepare a cast film, after which this cast film is cut into a 5-mm square to obtain an XNBR latex dry sample.

<Syneresis of Elastomer>

The elastomer used in one embodiment of the present invention forms particles having a particle size of about 50 to 250 nm as an aqueous emulsion. Elastomers include those having high syneresis properties and those having low syneresis properties. Generally speaking, the higher the syneresis properties, the more smoothly are the elastomer particles crosslinked in a shorter period at a lower temperature in the curing step.

The same tendency is also observed for the polycarbodiimide crosslinking according to one embodiment of the present invention. When an elastomer having low syneresis properties is used, the crosslinking does not proceed sufficiently and a satisfactory fatigue durability is not attained in some cases. Even when such an elastomer having low syneresis properties is used, the fatigue durability and the tensile strength can be greatly improved by performing agent (100° C., 22 hours). This means that the polycarbodiimide having a hydrophilic segment exists in the resulting glove film unless the polycarbodiimide is dried and the hydrophilic segment is thereby opened.

However, when an elastomer having high syneresis properties is used in the polycarbodiimide crosslinking, it is necessary to set the conditions in the gelling step such that the elastomer is not overly dried and the hydrophilic segment of the polycarbodiimide does not open. Accordingly, when an elastomer having high syneresis properties is used, it is desirable to perform the gelling step under a relatively low-temperature condition, and it can be appropriate to use a humectant in the case of performing the gelling step under a relatively high-temperature condition.

Meanwhile, when an elastomer having low syneresis properties is used, there is no problem in performing the gelling step at a relatively high temperature; however, it is necessary to set such conditions that allow the crosslinking to take place sufficiently by, for example, increasing the temperature in the curing step.

Further, a smaller average particle size of the XNBR particles leads to lower syneresis properties; however, since it leads to a larger specific surface area, the strength of inter-particle crosslinks are increased.

<Content of Elemental Sulfur in Elastomer>

In the elastomer used in one embodiment of the present invention, the content of elemental sulfur detected by neutralization-titration of a combustion gas is preferably 1% by weight or less of the elastomer weight. The elemental sulfur can be quantified by a method of allowing a hydrogen peroxide solution, to which a mixed indicator has been added, to absorb a combustion gas generated by combustion of 0.01 g of an elastomer sample in the air at 1,350° C. for 10 to 12 minutes, and subsequently performing neutralization-titration of the hydrogen peroxide solution with a 0.01N aqueous NaOH solution.

In the dip molding composition, a combination of plural kinds of elastomers can be incorporated as well. The content ratio of the elastomer(s) in the dip molding composition is not particularly restricted; however, it is preferably 15 to 35% by weight or so, more preferably 18 to 30% by weight, with respect to the total amount of the dip molding composition.

(2) Polycarbodiimide

The dip molding composition according to one embodiment of the present invention contains a polycarbodiimide as a crosslinking agent. The polycarbodiimide used in one embodiment of the present invention is constituted by a core moiety that undergoes a crosslinking reaction with a carboxyl group, and a hydrophilic segment added to a terminal of the core moiety. The terminal can be partially capped with a capping agent.

These components of the polycarbodiimide will now be described.

<Core Moiety of Polycarbodiimide>

First, the chemical formula of the core moiety of the polycarbodiimide used in one embodiment of the present invention is shown below in the form of a diisocyanate.

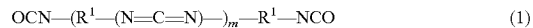

$$\text{OCN—}(R^1\text{—}(N=C=N)\text{—})_m\text{—}R^1\text{—NCO} \tag{1}$$

In this Formula (1), —N=C=N— is a carbodiimide group that reacts with a carboxyl group of the XNBR.

In this Formula, $R^1$ is exemplified by the below-described diisocyanates.

The m is an integer of 4 to 20 and indicates the degree of polymerization (the number of carbodiimide functional groups per molecule of the polycarbodiimide). By controlling the m to be 4 or larger, the polycarbodiimide can crosslink the carboxyl groups of the elastomer (XNBR) used in one embodiment of the present invention at multiple points, and the elastomer (XNBR) used in one embodiment of the present invention is consequently integrated in a lump. This is believed to be the reason why very good fatigue durability is attained as compared to a case of using a conventional two-point crosslinking agent.

The core moiety of the polycarbodiimide is usually generated by decarboxylation condensation of a diisocyanate and has an isocyanate residue on both terminals.

The diisocyanate can be, for example, an aromatic diisocyanate, an aliphatic diisocyanate, an alicyclic diisocyanate, or a mixture thereof. Specific examples thereof include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate. From the standpoint of the weather resistance, it is preferred to incorporate a polycarbodiimide generated by a condensation reaction involving decarboxylation of an aliphatic or alicyclic diisocyanate. In other words, since the above-described diisocyanate has no double bond, a polycarbodiimide generated therefrom is unlikely to be deteriorated by ultraviolet radiation or the like.

One representative type of the diisocyanate is dicyclohexylmethane-4,4'-diisocyanate.

<Hydrophilic Segment>

Carbodiimide groups readily react with water; therefore, in the dip molding composition according to one embodiment of the present invention, in order to protect carbodiimide groups from water such that their reactivity with the elastomer (XNBR) used in one embodiment of the present invention is not lost, it is indispensable that a hydrophilic segment be added to the terminals (isocyanate groups) of some of the polycarbodiimide molecules.

The following Formula (2) shows the structure of the hydrophilic segment.

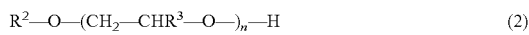

$$R^2-O-(CH_2-CHR^3-O-)_n-H \quad (2)$$

In this Formula (2), $R^2$ represents an alkyl group having 1 to 4 carbon atoms; $R^3$ represents a hydrogen atom or a methyl group; and n represents an integer of 5 to 30.

In the dip molding composition (dipping liquid/water), the hydrophilic segment functions to protect carbodiimide groups by surrounding the core moiety of the polycarbodiimide that readily reacts with water (shell-core structure).

Meanwhile, drying causes the hydrophilic segment to open, thereby creating a state where the carbodiimide groups are exposed to be available for reaction. Therefore, in the glove production by dip molding according to the present invention, it is important to reduce the amount of water only after proceeding to the below-described curing step and to thereby open the hydrophilic segment and crosslink the carbodiimide groups with the carboxyl groups of the XNBR. For this purpose, it is also effective to add the below-described humectant to the dip molding composition in the gelling step and prevent the XNBR having high syneresis properties from being dried.

The hydrophilic segment can be added to both or either one of the terminals of the core moiety. Further, a mixture of a polycarbodiimide having the hydrophilic segment and a polycarbodiimide having no hydrophilic segment can be used as well.

The terminal to which the hydrophilic segment is not added is capped with a capping agent.

<Capping Agent>

The capping agent is represented by the following Formula (3).

$$(R^4)_2N-R^5-OH \quad (3)$$

In this Formula (3), $R^4$ represents an alkyl group having not more than 6 carbon atoms and, from the availability standpoint, $R^4$ is preferably an alkyl group having not more than 4 carbon atoms. $R^5$ represents an alkylene having 1 to 10 carbon atoms or a polyoxyalkylene.

<Number of Carbodiimide Functional Groups Per Molecule, Polymerization Degree, Molecular Weight, and Equivalent>

The number of carbodiimide functional groups in the polycarbodiimide used in one embodiment of the present invention is preferably 4 or larger. By controlling the number of carbodiimide functional groups to be 4 or larger, the multi-point crosslinking is certainly performed, the fatigue characteristics required in practice are satisfied.

The number of carbodiimide functional groups can be determined from the values of the below-described polycarbodiimide equivalent and number-average molecular weight.

The number of carbodiimide functional groups per molecule, which is the average polymerization degree of the polycarbodiimide (number-average molecular weight/carbodiimide equivalent), is 4 or larger, preferably 9 or larger. This is required for appropriately forming multi-point cross-linked structures, which is a characteristic feature of the glove according to one embodiment of the present invention, and thereby imparting the glove with high fatigue durability.

The molecular weight of the polycarbodiimide is preferably 500 to 5,000, more preferably 1,000 to 4,000, in terms of number-average molecular weight.

The number-average molecular weight can be measured as follows by a GPC method (calculated in terms of polystyrene).

Measuring apparatus: HLC-8220GPC, manufactured by Tosoh Corporation

Columns: SHODEX KF-G+KF-805L×2+KF-800D

Eluent: THF

Measurement temperature: column incubator at 40° C.

Flow rate: 1.0 mL/min

Concentration: 0.1 wt/vol %

Solubility: complete dissolution

Pretreatment: A sample is adjusted by air-drying in a nitrogen stream and subsequent vacuum-drying at 70° C. for 16 hours, and filtered through a 0.2-μm filter before the measurement.

Detector: differential refractometer (RI)

The number-average molecular weight is calculated using a monodispersed polystyrene standard sample.

From the standpoint of the fatigue durability, the carbodiimide equivalent is preferably in a range of 260 to 440.

The carbodiimide equivalent is a value calculated using the following equation (I) from the carbodiimide group concentration measured by a back titration method using oxalic acid:

$$\text{Carbodiimide equivalent} = \text{Number of carbodiimide groups } (40) \times 100/\text{Carbodiimide group concentration } (\%) \quad (I)$$

In the dip molding composition according to one embodiment of the present invention, the polycarbodiimide is added in an amount of, for example, greater than 0.2% by weight but 4.0% by weight or less, preferably 0.3 to 2.5% by weight, more preferably 0.3 to 2.0% by weight, with respect to the solid content of the dip molding composition. With regard to the range of this amount, it has been verified that, while the profitability is deteriorated when the amount is greater than 4.0% by weight, even a relatively small amount of slightly greater than 0.2% by weight can impart the resulting glove with fatigue durability superior to those of other sulfur-based gloves.

<Average Particle Size of Polycarbodiimide>

In the present invention, the "average particle size" of the polycarbodiimide refers to an average value of the particle size of individual micelles formed by the polycarbodiimide that is measured by a dynamic light scattering method under the following conditions.

Measuring apparatus: ZETASIZER Nano ZS (manufactured by Malvern Panalytical Ltd.)

Light source: He—Ne (40 mW) 633 nm

Measurement temperature: 25° C.

Viscosity of dispersion medium: 0.887 cP (the value of water is used)

Refractive index of dispersion medium: 1.33 (the value of water is used)

Sample preparation: 100-fold dilution with ion exchanged water

The average particle size of the polycarbodiimide according to one embodiment of the present invention is preferably 5 to 30 nm.

With regard to the polycarbodiimide, when the number of carbodiimide functional groups per molecule is 5 or larger and the average particle size is 30 nm or smaller, even after a certain period of time has passed from the preparation of the dip molding composition, the dip molding composition is expected to be capable of yielding a cured film having a high fatigue durability. Specifically, when the polycarbodiimide and other constituents are mixed into the dip molding composition and a certain period has passed thereafter, a cured film obtained from the dip molding composition after the lapse of time is expected to be prevented from having a fatigue durability inferior to that of a cured film obtained from the dip molding composition prior to the lapse of time.

(3) pH Modifier

In the production of a glove using an XNBR, it is indispensable to adjust the dip molding composition to have a pH of 9.5 to 10.5 with a pH modifier until the completion of dipping.

Usually, the pH of an XNBR latex is adjusted to be 8 to 8.5. In this case, carboxyl groups of the XNBR are oriented on the inside of the polymer particles; therefore, at the time of performing inter-particle crosslinking with a polycarbodiimide and, as required, a metal crosslinking agent, a greater number of carboxyl groups can be oriented on the outside of the XNBR particles as the pH is increased using a pH modifier, whereby the number of carboxyl groups to be crosslinked can be increased.

On the other hand, in polycarbodiimide-crosslinked gloves, fatigue durability is provided by covalent bonds formed by carboxyl groups of an XNBR and a polycarbodiimide. When a metal crosslinking agent such as Zn is used in combination, tensile strength is provided by ionic bonds formed by the carboxyl groups of the XNBR and the metal crosslinking agent. When a metal crosslinking agent having a low ionization tendency such as zinc is used, most of the metal crosslinking agent can be efficiently crosslinked depending on the added amount thereof. Some of Ca and alkali metals that have a high ionization tendency are subsequently removed by washing with water in the leaching step; however, Ca and alkali metals remaining in a cured film precursor bind with carboxyl groups.

Meanwhile, the polycarbodiimide can covalently bind with only the carboxyl groups remaining unbound with Ca or an alkali metal during the curing step.

The polycarbodiimide can impart the resulting cured film with a high fatigue durability in an extremely small amount of about 0.2% by weight with respect to the solid content of the dip molding composition. However, when an alkali metal hydroxide such as potassium hydroxide was actually used as a pH modifier in polycarbodiimide-crosslinked gloves, the gloves were observed to have a tendency of showing poor fatigue durability as compared to those cases where ammonium hydroxide was used. It has been gradually understood that this is caused by the fact that the carboxyl groups of the XNBR to be crosslinked bind with calcium, an alkali metal or a metal crosslinking agent added as an optional component and this prevents the polycarbodiimide from sufficiently engaging in crosslinking.

Therefore, the present inventors examined the conditions of the leaching step that allow calcium and alkali metal(s) to be removed, and considered reducing the total amount of calcium and alkali metal(s) to be contained in the resulting cured film to a certain level or below.

In actual experiments, it was found that carboxyl groups to be crosslinked with a polycarbodiimide are secured by adjusting the total content of calcium and alkali metal(s) in the resulting cured film to be a certain level or below, whereby the fatigue durability of the cured film can be greatly improved. From this, it was found possible to use an alkali metal hydroxide as a pH modifier in a polycarbodiimide-crosslinked glove.

The leaching step is an important step that is aimed at, in order to allow crosslinking to proceed smoothly in the subsequent curing step, for example, removing an emulsifier constituting a film of XNBR particles, converting —COO— oriented on the outside of the XNBR particles back to —COOH, and converting a metal crosslinking agent, which is optionally used, from being a complex ion into the form of a water-insoluble hydroxide and thereby retaining the metal crosslinking agent in the resulting film. Moreover, it was found that the leaching step is the most important step for reducing the total content of Ca and alkali metal(s) to a certain level or below in those cases where a polycarbodiimide is crosslinked using an alkali metal hydroxide, such as potassium hydroxide, as a pH modifier as in the present invention.

In the present invention, the dip molding composition is adjusted to have a pH of 9.5 to 10.5. A pH of lower than 9.5 leads to insufficient crosslinking and, therefore, the performance of the resulting glove cannot be maintained. A pH of higher than 10.5 deteriorates the latex stability. When an alkali metal hydroxide such as potassium hydroxide is used as a pH modifier, the alkali metal hydroxide is usually adjusted with an aqueous solution having a concentration of about 5% by weight. The content of the alkali metal hydroxide in the dip molding composition is about 2 parts by weight at a pH of 10.0 and about 2.5 parts by weight at a pH of 10.5. These content values are also the same when potassium hydroxide is used as the alkali metal hydroxide.

In inter-particle crosslinking of an XNBR, it is preferred to increase the pH so as to orient as many carboxyl groups of the XNBR as possible on the outside; however, when an alkali metal hydroxide is used as a pH modifier, an increase in the amount thereof to be added can potentially increase the amount of residual alkali metal by that much. Therefore, taking into consideration both of these aspects, the pH is preferably about 10.0.

(4) Zinc Compound and/or Aluminum Compound (A) Zinc Compound

In a preferred embodiment of the present invention, when a small amount of a zinc compound is added to the dip molding composition in addition to the above-described polycarbodiimide, for example, an improvement in the tensile strength of a cured film obtained from the dip molding composition, inhibition of swelling of the cured film in an artificial sweat solution, and an improvement in the organic solvent impermeability of the cured film can be expected.

Examples of the zinc compound include zinc oxide and zinc hydroxide, and zinc oxide is mainly used.

The zinc oxide used in this embodiment of the present invention is not particularly restricted and, usually, any commonly used zinc oxide can be used. It is noted here that the content of zinc oxide is proportional to the initial tensile strength of the resulting glove and that, therefore, the tensile strength of the glove can be adjusted by changing the content of zinc oxide. Particularly, in the production of a thin glove, the desired tensile strength can be imparted to the resulting glove by increasing the amount of zinc oxide to be added.

A crosslinking reaction of zinc oxide is described below.

When zinc oxide is added at the time of preparing the dip molding composition, since Zn mostly forms $[Zn(OH)_3]^-$ or $[Zn(OH)_4]^{2-}$ and is negatively charged, Zn does not form a salt with a carboxyl group of the elastomer (XNBR) contained in the dip molding composition.

However, in the leaching step, a reduction in pH causes Zn to be retained in the form of $Zn(OH)_2$ in the resulting cured film precursor. Further, by drying and heating in the curing step, the carboxyl groups of the XNBR and $Zn^{2+}$ form crosslinks via ionic bonds.

Zn, as a metal crosslinking agent, binds with the carboxyl groups faster than Ca and an alkali metal, and stably exists once bound. Even if the carboxyl groups of the XNBR have already been bound with Ca or an alkali metal, Zn can substitute the Ca or alkali metal to perform crosslinking. Therefore, it is believed that the added Zn mostly forms crosslinks in the resulting glove.

In the dip molding composition according to one embodiment of the present invention, when zinc oxide is added, the amount thereof is usually, for example, 0.5 to 2.0 parts by weight, 0.8 to 1.5 parts by weight, with respect to the total solid content of the dip molding composition. An amount of 1.5 parts by weight is set for maintaining the tensile strength in the case of preparing a ultrathin cured film.

(B) Aluminum Compound

In a polycarbodiimide-crosslinked glove, an aluminum compound can be used in the same manner as a zinc compound for the purposes of, for example, inhibiting a reduction in the strength in an artificial sweat solution, improving the tensile strength, and improving the organic solvent impermeability.

An aluminum compound itself has a higher binding strength than a zinc compound and exhibits an effect of enhancing the fatigue durability of a cured film; however, it also has an effect of making the glove hard and fragile, and an excessively large amount thereof can rather reduce the tensile strength.

When aluminum is used as a crosslinking agent, tetrahydroxyaluminate ions ($[Al(OH)_4]^-$; hereinafter, referred to as "aluminum complex ion") can exist in the dip molding composition along with a stabilizer that stabilizes the tetrahydroxyaluminate ions.

As a material of the aluminum complex ions, for example, an aqueous aluminate solution, or an acidic aqueous aluminum solution of aluminum chloride or the like that has been converted into a basic aqueous solution with an alkali can be used.

As the stabilizer, an alcohol compound, a hydroxycarboxylic acid or a salt thereof can be used. Specifically, examples of the alcohol compound include sugar alcohols such as sorbitol, saccharides such as glucose, and polyhydric alcohols such as glycerol and ethylene glycol, and examples of the hydroxycarboxylic acid include glycolic acid, citric acid, malic acid, and lactic acid. The material of the aluminum complex ions and the stabilizer can be added to the dip molding composition as separate compounds, or aluminum citrate, aluminum lactate or the like can be obtained and added in a basic form.

A reaction of aluminum with a carboxyl group proceeds by the same mechanism as that of zinc. In the dip molding composition, aluminum exists in the form of a complex ion; however, the complex ion is converted into $Al(OH)_3$ in the leaching step and then into $Al^{3+}$ in the curing step to form crosslinks with carboxyl groups via ionic bonds.

It is believed that aluminum cannot be substituted with Zn or Ca but can be substituted with an alkali metal.

In the present invention, the amount of aluminum to be added is preferably 0.2 to 1.5 parts by weight in terms of aluminum oxide ($Al_2O_3$) with respect to the total solid content of the dip molding composition.

(C) Combination of Zinc Compound and Aluminum Compound

In the present invention, when an aluminum compound is used as a metal crosslinking agent, it is preferred to also use a zinc compound in combination. This moderates the curing of a cured film, which is a drawback of the aluminum compound, whereby a cured film showing good elongation can be prepared.

In the present invention, the aluminum compound and the zinc compound are added in a total amount of preferably 0.7 to 2.3 parts by weight with respect to the total solid content of the dip molding composition. The ratio of the amounts of these compounds to be added ($ZnO:Al_2O_3$) is preferably 1:0.6 to 1:1.2.

(5) Humectant

In order to prevent a cured film precursor from being dried and the polycarbodiimide from being deactivated due to opening of its hydrophilic segment in the gelling step of a polycarbodiimide-crosslinked glove, a humectant can be added to the dip molding composition as required. When an alkali metal hydroxide is used as a pH modifier, since the alkali metal hydroxide is believed to have a moisturizing function, there are not many cases where a humectant is necessary as compared to when an ammonium compound is used as a pH modifier. The necessity of a humectant is increased when an XNBR having high syneresis properties is used and it is heated to a high temperature of, for example, 80° C. or higher in the gelling step or the like. In addition, since a cured film having a smaller thickness is more readily dried, a humectant can be necessary in such a case.

Examples of the humectant include polyols, among which a divalent or trivalent compound is preferably used. Specifically, examples of the divalent compound include ethylene glycol, propylene glycol, tetramethylene glycol, diethylene glycol, dipropylene glycol and polyethylene glycol, and examples of the trivalent compound include glycerol. Thereamong, the dip molding composition preferably contains glycerol as a humectant.

When a humectant is used, the amount thereof is, for example, 1.0 to 5.0 parts by weight or so, preferably 1.5 to 3.0 parts by weight, with respect to 100 parts by weight of the elastomer contained in the dip molding composition.

(6) Other Components

In addition to the above-described components, the dip molding composition can also contain other optional component(s), such as a dispersant, an antioxidant, a pigment, and/or a chelating agent.

The dispersant is preferably an anionic surfactant, and examples thereof include carboxylates, sulfonates, phosphates, polyphosphates, high-molecular-weight alkyl aryl sulfonates, high-molecular-weight sulfonated naphthalenes, and high-molecular-weight naphthalene/formaldehyde condensation polymers, among which a sulfonate is preferably used.

As the dispersant, a commercially available product can be used. For example, TAMOL NN9104 can be used. The amount thereof to be used is preferably about 0.5 to 2.0 parts by weight with respect to 100 parts by mass of the elastomer contained in the dip molding composition.

As the antioxidant, a hindered phenol-type antioxidant, such as WINGSTAY L, can be used. As the pigment, for example, titanium dioxide can be used. As the chelating agent, sodium ethylenediaminetetraacetate or the like can be used.

2. Glove Production Method

A method of producing a glove by dip molding of an XNBR has been established as a conventional method of producing a glove using sulfur and zinc as crosslinking agents. The basic steps are the same also in a case of using a polycarbodiimide as a crosslinking agent as in the present invention; however, in a case of using a polycarbodiimide having a hydrophilic segment is used, it is necessary to change the conditions of some of the conventional steps. Further, when an alkali metal hydroxide is used as a pH modifier in the production of a polycarbodiimide-crosslinked glove, it is necessary to change some of the conditions relating to the use of the alkali metal hydroxide.

In view of the above, the steps of a method of producing a glove by dip molding of an XNBR, where a polycarbodiimide is used along with an alkali metal hydroxide as a pH modifier, will now be described one by one.

(a) Coagulant Adhesion Step

The coagulant adhesion step is a step that is usually performed in the production of a glove by dip molding of an XNBR.

In this step, usually, a mold or a former (glove forming mold) is immersed in a coagulant solution that contains a coagulant and $Ca^{2+}$ ions as a gelling agent in an amount of usually 5 to 40% by weight, preferably 8 to 35% by weight, and the entirety or a part of the surface of the mold or the former to which the coagulant has thus adhered is subsequently dried at 50 to 70° C. In this step, the duration of allowing the coagulant and the like to adhere to the surface of the mold or the former is determined as appropriate, and it is usually 10 to 20 seconds or so. As the coagulant solution, for example, an aqueous solution that contains 5 to 40% by weight of a coagulant such as calcium nitrate or calcium chloride, or a flocculant such as an inorganic salt having an effect of precipitating the elastomer, is used. It is preferred that the coagulant solution also contain potassium stearate, calcium stearate, a mineral oil, an ester-based oil or the like as a release agent in an amount of 0.5 to 2% by weight or so, for example, about 1% by weight.

The coagulant plays a role in causing the elastomer (XNBR) to aggregate in the dipping step, and the calcium ions contained in the coagulant form calcium crosslinks in the resulting cured film.

In the present invention, it is an important point to adjust such calcium crosslinking.

(b) Dispersion Step of Dip Molding Composition

This is the step of stirring and dispersing a dip molding composition. This step is also referred to as "aging" and can be usually performed for a period of, for example, 5 hours or longer, and it is most preferred to perform the aging for about 24 hours. In this process, the dip molding composition is adjusted with a pH modifier to have a pH of 9.5 to 10.5 or so. It is necessary to maintain this state until the completion of dipping.

The dispersion step relates to the working life (pot life) of the dip molding composition and, practically, it may require 3 to 5 days or so. A polycarbodiimide has a hydrophilic segment and thus contributes to an adequate pot life.

Further, when an alkali metal hydroxide is used as the pH modifier, a reduction in the pH of the dip molding composition with time, which occurs with the use of an ammonium compound as a pH modifier, hardly occurs and the pH can thus be easily controlled.

The reason for adjusting the dip molding composition to have a pH of 9.5 to 10.5 is to orient carboxylate groups of the XNBR particles on the outside and to thereby allow interparticle crosslinking to take place between the polycarbodiimide and an optionally-added metal crosslinking agent, and it is important to maintain such a pH.

The following steps (c) to (h) constitute a continuous process.

(c) Dipping Step

The dipping step is the step of immersing the mold or the former, which has been dried in the step (a), in the dip molding composition, for example, for a period of 10 to 30 seconds at a temperature of 25 to 40° C., and thereby allowing the dip molding composition to adhere to the mold or the former to which the coagulant has adhered. In this dipping step, the calcium ions contained in the coagulant cause the elastomer in the dip molding composition to aggregate on the surface of the mold or the former, whereby a film is formed.

In the thus formed film, the components of the dip molding composition (XNBR, polycarbodiimide, alkali metal hydroxide, and other optional components) are believed to be each maintained at substantially the same concentration.

As described above, by maintaining the pH of the dip molding composition to be 9.5 to 10.5, the carboxylate groups of the XNBR particles are oriented on the outside.

(d) Gelling Step

In the conventional gelling step, generally, the mold or the former to which the dip molding composition has adhered in the step (c) is heated and dried at 80 to 140° C. for 60 to 240 seconds.

The gelling step is the step aimed at gelling a film pulled out of the dip molding composition and allowing the film to settle to a certain extent such that the elastomer does not elutes out in the subsequent leaching step. The film at this point is referred to as "cured film precursor". This step is also aimed at dispersing Ca in the entirety of the film during gelling.

In a method of producing a polycarbodiimide-crosslinked glove, the conditions of this step are different from those of the conventional gelling step. In a method of producing a polycarbodiimide-crosslinked glove, it is indispensable to prevent the cured film precursor from being dried. The reason for this is because, when the cured film precursor is dried, the hydrophilic segment of the polycarbodiimide is opened and the polycarbodiimide is thereby deactivated before the curing step. The drying conditions of the cured film precursor vary depending on the syneresis properties of the XNBR and the thickness of the film; however, basically, it is believed preferred not to heat the cured film precursor at a high temperature as in the conventional conditions. Practically, even without heating, the temperature of the ambient environment and the surface temperature of the cured film precursor are both considerably high at about 30 to 40° C. and about 40 to 50° C., respectively. Therefore, in those cases where the cured film precursor is produced at a temperature of the conventional gelling step because of the problem in the film formation, an XNBR having high syneresis properties is used, or an ultrathin cured film is to be produced, it is preferred to prevent the cured film precursor from being dried by adding a humectant to the dip molding composition.

When an alkali metal hydroxide is used as a pH modifier with consideration of the above-described precautions regarding the production conditions of a polycarbodiimide-crosslinked glove, the temperature of the gelling step can be relatively higher than that in a case of using an ammonium compound as a pH modifier. The reason for this is because it is believed that, although a greater amount of ammonia generated from an ammonium compound added as a pH modifier is volatilized at a higher heating temperature, an alkali metal hydroxide conversely has a moisturizing function.

As the conditions of the gelling step in the production method of the present invention, it is preferred to leave the cured film precursor at 40 to 120° C. for 20 seconds to 4 minutes.

(e) Leaching Step

The leaching step is the step of, after the gelling step, washing the cured film precursor adhering on the glove forming mold with water to remove excess water-soluble substances. This step is a very important step as a basis for performing the subsequent curing step.

A first point is that, by washing the cured film precursor with water and thereby lowering the pH from a range of about 9.5 to 10.5 to a weakly alkaline range of about 7.2 to 7.3, the carboxylate groups oriented on the outside of the XNBR particles are converted into carboxyl groups, whereby carboxyl groups to be crosslinked during curing are established. In this process, the latex particles are arranged in layers and the freedom of changing the orientation of carboxyl groups has thus been lost, the carboxyl groups will no longer be oriented on the inside. Meanwhile, when a metal crosslinking agent such as zinc is used as a crosslinking agent, zinc complex ions are converted into $Zn(OH)_2$ and directly retained in the cured film precursor along with the polycarbodiimide, without being washed away with water. As a result of the above, the preparation for performing the crosslinking in the curing step is completed.

A second point is that the crosslinking in the curing step is made more likely to occur by washing the cured film precursor with water and thereby removing the emulsifier forming films on the particles in the cured film precursor as much as possible.

In the method of producing a polycarbodiimide-crosslinked glove according to the present invention, since an alkali metal hydroxide is used as a pH modifier, the temperature and the duration of the leaching step are important conditions for imparting the resulting cured film of 50 to 100 µm in thickness with sufficient fatigue durability. According to the below-described Experiment 1, it was found that the fatigue durability of a cured film is abruptly improved and a stable cured film can thus be obtained when the leaching step is performed for a period of 1.5 minutes or longer (a period in which a cured film precursor is kept in contact with water) with the temperature (water temperature) being set at 40 to 70° C. Generally, in the cured film precursor, the number of the carboxyl groups of the XNBR is smaller than the total number of crosslinking agent molecules and metal ions that can potentially bind with the carboxyl groups; therefore, when leaching is not adequate, the resulting glove has a poor quality due to an increase in the amount of uncrosslinked components in the cured film of the glove. Accordingly, in the present invention, the conditions of the leaching step are important for obtaining a glove having good fatigue durability. The temperature (water temperature) in the leaching step is preferably 40 to 60° C., more preferably 45 to 55° C. Further, the duration of the leaching step is more preferably 2 minutes or longer. However, the duration of the leaching step is 4 minutes or shorter, preferably 3.5 minutes or shorter, more preferably 3 minutes or shorter, still more preferably 2.5 minutes or shorter. The duration of the leaching step refers to a period of washing the cured film precursor with water. The washing with water can be performed by, for example, immersing the cured film precursor in water.

(f) Beading Step

The beading step is the step of, after the completion of the leaching step, performing a sleeve rolling process in the cuff portion of the resulting glove.

(g) Precuring Step

The precuring step is the step of, after the beading step, drying the mold or the former in a furnace at 60 to 90° C., more preferably at 65 to 80° C., for 30 seconds to 10 minutes. By incorporating this step, partial expansion of the resulting glove that may occur due to rapid reduction in water content in the subsequent step (h) can be inhibited.

(h) Curing Step

This step is the step of heating and drying the cured film precursor to crosslink the polycarbodiimide used as a crosslinking agent and a metal crosslinking agent that can be incorporated as an optional component and to ultimately obtain a cured film (glove). The cured film precursor is generally heated and dried at a temperature of 100 to 140° C. for 15 to 30 minutes.

In the curing step, the crosslinking can be efficiently carried out when an XNBR having high syneresis properties is used; however, when an XNBR having low syneresis properties is used, sufficient performance is not attained in some cases due to insufficient crosslinking.

As for the polycarbodiimide itself, its hydrophilic segment is opened when the cured film precursor is dried, and the polycarbodiimide is thereby crosslinked with the carboxyl groups of the XNBR; therefore, the curing step can be performed at a relatively low temperature of about 100° C.

When a metal crosslinking agent is used as a crosslinking agent, it is believed that substantially the whole amount of the metal crosslinking agent such as Zn or Al contained in the cured film precursor can secure crosslinks with the carboxyl groups of the XNBR in the curing step. Particularly, Zn is capable of substituting and crosslinking even Ca crosslinked with the carboxyl groups.

Subsequently, Ca, which is contained in a large amount in the cured film precursor, is crosslinked with the carboxyl groups of the XNBR, and a considerable amount of Ca remains in the resulting glove.

Thereafter, the carboxyl groups of the XNBR bind and an alkali metal are bound. It is noted here that the alkali metal is not involved in crosslinking.

After these crosslinking and binding processes, the remaining carboxyl groups of the XNBR and the polycarbodiimide can crosslink with each other. Therefore, in order to secure the carboxyl groups of the XNBR to be crosslinked with the polycarbodiimide, it is necessary to reduce the content of Ca and alkali metal in the cured film precursor as much as possible by the leaching step, whereby sufficient fatigue durability can be imparted to the resulting cured film. At this point, the alkali metal binds only with the carboxyl groups without showing any crosslinking function and is, therefore, a substance that would be best removed.

In the above-described production process, the glove forming mold is immersed in the dip molding composition only once; however, in the present invention, a glove can also be produced by performing the immersion operation plural times (twice or three times). Such a method is effective for inhibiting the generation of pinholes, which is a concern when a thin glove of about 50 µm in thickness is to be produced. This method is also effective for producing a thick glove.

In a case of performing the immersion operation twice, the dipping step is performed and the gelling step is subsequently performed, after which the dipping step and the gelling step are further performed. In a case of performing the immersion operation three times, the dipping step and the gelling step are further performed thereafter. In both of these cases, by incorporating the gelling step, the production process proceeds to the subsequent dipping operation after the formation of a certain amount of Ca crosslinks in the cured film precursor.

3. Glove According to One Embodiment of Present Invention

As one embodiment of the present invention, in a glove having a film thickness of 50 to 100 μm that is produced using potassium hydroxide as a pH modifier, good fatigue durability and tensile strength can be attained when the total content of calcium and potassium in the glove is 1.15% by weight or less.

The above-described glove can be produced in accordance with the above-described method of producing a glove according to one embodiment of the present invention using the dip molding composition of the above-described embodiment.

The glove according to one embodiment of the present embodiment is composed of a cured film formed by curing the above-described dip molding composition, and the elastomer (XNBR) contained in the cured film can have, for example, the same formulation as the elastomer added to the dip molding composition.

Further, the cured film has crosslinks formed by a polycarbodiimide (CDI crosslinks), crosslinks formed by calcium (Ca crosslinks) and, when zinc oxide and/or an aluminum complex is/are added, crosslinks formed by zinc oxide (Zn crosslinks) and/or crosslinks formed by the aluminum complex (Al crosslinks).

In the glove according to one embodiment of the present invention, when the film thickness is 50 to 100 μm, crosslinks formed the polycarbodiimide are allowed to exist in an adequate amount by controlling the total content of calcium and potassium to be 1.15% by weight or less, and sufficient fatigue durability is attained even with an addition of the polycarbodiimide in a small amount.

The physical properties of the glove according to one embodiment of the present invention are aimed at the following (1) and (2):

(1) a fatigue durability of 240 minutes or longer; and
(2) a tensile strength of 20 MPa or higher (T/S value determined in accordance with ASTM in the below-described experimental examples).

The term "fatigue durability" used herein means the resistance of a glove against deterioration in performance and breakage that are caused by the sweat of a user (worker). A concrete evaluation method thereof is described below.

With regard to the fatigue durability, since the finger crotch portion of a glove is likely to be torn, a fatigue durability of longer than 90 minutes in the finger crotch portion is usually taken as a practical acceptable level; however, in the present invention, a film is produced on a ceramic plate to test the fatigue durability, the fatigue durability corresponding to that of the palm portion is examined.

The fatigue durability of the palm portion and that of the finger crotch portion are interconvertible using the following equation:

(Fatigue durability (minute) of palm portion+21.43)/ 2.7928=Fatigue durability (minute) of finger crotch portion Accordingly, in the present invention, the acceptable level in a fatigue durability test is set at 240 minutes.

In order to achieve the above-described target values, the amount of the metal crosslinking agent to be added is adjusted as appropriate, and the content thereof in the glove is thereby adjusted. For example, the tensile strength can be adjusted by increasing or decreasing the amount of zinc to be added.

The thickness of the glove can be adjusted in accordance with the intended purpose thereof within a range of, for example, 50 to 100 μm, and the glove can be used as an accelerator-free disposable glove for medical, food, or cleanroom use.

The content of an alkali metal (e.g., potassium) and that of calcium and zinc in a dip-molded article (glove) are measured by the following procedures:

(1) measurement of the weight of a sample (depending on the amount of provided sample); (2) ashing in an electric furnace, (3) treatment with sulfuric acid-hydrofluoric acid, (4) dissolution in hydrochloric acid, (5) adjustment to a constant volume (100 mL), (6) quantification by flame atomic absorption spectrometry (apparatus name: VALIAN AA240)

EXAMPLES

The below-described experiments were aimed at finding out the conditions required for producing a polycarbodiimide-crosslinked glove using an alkali metal hydroxide as a pH modifier. At the same time, the below-described experiments were also aimed at verifying the performance of the obtained gloves.

In the below-described experiments, the performance was verified for films that were each obtained using a dip molding composition adjusted to have a pH of 10.0 or 10.5 by an alkali metal hydroxide, specifically potassium hydroxide, with varying temperature and duration of leaching.

In addition, the amount of Zn, Ca and K contained in the obtained films was quantified, and the relationship between this amount and the film performance was verified. Further, the conditions for imparting practically applicable performance to gloves of 50 to 100 μm in film thickness even when an alkali metal hydroxide such as potassium hydroxide is used were examined.

In the below-described experimental examples, the results of experiments that were conducted to examine the conditions according to the embodiments of the present invention are shown. In these experimental examples, specific examples of the present invention are described in detail; however, it is obvious for those skilled in the art that various changes and modifications can be made without departing from the gist and the scope of the present invention.

1. Materials Used in Dip Molding Composition

The materials of the dip molding composition used in the present Examples are as follows:

(1) Elastomer (XNBR) Latex

As an elastomer XNBR latex, NL128 (trade name) manufactured by LG Chem, Ltd. was mainly used. The physical properties thereof were as follows.

Mooney viscosity ($ML_{(1+4)}$ 100° C.): 100 to 102
MEK-insoluble content: 3.0 to 5.4% by weight
Amount of MMA (COOH): 5.0 to 5.6% by weight
Amount of AN: 31% by weight
Solid content: 45% by weight The Mooney viscosity ($ML_{(1+4)}$ 100° C.), the MEK-insoluble content, the amount of MMA and the amount of AN were determined in accordance with the respective methods described above in the section of "MODE FOR CARRYING OUT THE INVENTION".

(2) Polycarbodiimide

In the present Examples, V-02-L2 manufactured by Nisshinbo Chemical Inc. was mainly used as a polycarbodiimide. The physical properties thereof were as follows.

Average particle size: 11.3 nm
Number-average molecular weight: 3,600
Number of carbodiimide functional groups per molecule: 9.4

(3) pH Modifier

As a pH modifier, an alkali metal hydroxide (potassium hydroxide manufactured by Kanto Chemical Co., Inc., special grade) was mainly used. The pH of the dip molding composition was adjusted to be 10.0 or 10.5 using potassium hydroxide.

In addition, sodium hydroxide (manufactured by Kanto Chemical Co., Inc., special grade) was partially used.

As ammonia of Comparative Example, a 28% aqueous solution of ammonium hydroxide (manufactured by Kanto Chemical Co., Inc., special grade) was used.

(4) Other Materials Used

As a metal crosslinking agent, an antioxidant and a white pigment, zinc oxide (manufactured by Farben Technique (M), trade name "CZnO-50"), trade name "CVOX-50" manufactured by Farben Technique (M) and titanium oxide (manufactured by Farben Technique (M), trade name "PW-601") were used, respectively.

2. Glove Production Method (1) Preparation of Dip Molding Composition

To a 1-L beaker (manufactured by AS ONE Corporation, 105 mm in body diameter×150 mm in height), 220 g of the XNBR latex (NL128) was added, and the XNBR latex was diluted by adding thereto 200 g of water, followed by initiation of stirring. After preliminarily adjusting the pH to be 9.2 to 9.3 using potassium hydroxide, the polycarbodiimide was added in an amount of 0.5 parts by weight with respect to 100 parts by mass of the elastomer. Further, 0.2 parts by weight of the antioxidant, 1.0 part by weight of zinc oxide and 1.0 part by weight of titanium oxide were added, and the resultant was mixed by stirring for 16 hours. Subsequently, the resulting mixture was adjusted with a 5%-by-weight aqueous potassium hydroxide solution to have a pH of 10.0 or 10.5. The amount of added potassium hydroxide was about 2.0 parts by weight for the case of pH 10.0, or about 2.5 parts by weight for the case of pH 10.5. Thereafter, water was further added to adjust the solid concentration.

In the resulting dip molding composition, the solid content was 16% by weight for a film thickness of 50 to 60 µm, 19% by weight for a film thickness of 60 to 70 µm, 22% by weight for a film thickness of 70 to 80 µm, or 26% by weight for a film thickness of 90 to 100 µm.

The amount of the thus obtained dip molding composition was about 500 g. It is noted here that the dip molding composition was continuously stirred in the beaker until use.

(2) Preparation of Coagulant

After diluting 19.6 g of "S-9" (trade name, solid concentration: 25.46%, manufactured by Crestage Industry Sdn. Bhd.) by about 2-fold using a portion of 50 g of water that had been previously weighed, the thus diluted S-9 was slowly added as a dispersant to a solution obtained by dissolving 0.56 g of a wetting agent "TERIC 320" (trade name, manufactured by Huntsman Corporation) in 42.0 g of water. The whole amount of the S-9 was added while washing out the residual S-9 in the container with remaining water, and the resultant was stirred for 3 to 4 hours. Separately, in a 1-L beaker (manufactured by AS ONE Corporation, 105 mm in body diameter×150 mm in height), an aqueous calcium nitrate solution was prepared by dissolving 143.9 g of calcium nitrate tetrahydrate in 153.0 g of water, and the above-prepared S-9 dispersion was added thereto with stirring. The resultant was adjusted with 5% aqueous ammonia to have a pH of 8.5 to 9.5 and to eventually contain calcium nitrate as an anhydride in an amount of 14% by weight for a film thickness of 50 to 60 µm, 17% by weight for a film thickness of 60 to 70 µm, 20% by weight for a film thickness of 70 to 80 µm, or 24% by weight for a film thickness of 90 to 100 µm. Further, water was added such that the S-9 had a solid concentration of 1.2%, whereby 500 g of a liquid coagulant was obtained. The thus obtained liquid coagulant was continuously stirred in the 1-L beaker until use.

(3) Adhesion of Coagulant to Ceramic Plate

The liquid coagulant obtained above was heated to 50° C. with stirring, filtered through a 200-mesh nylon filter and then added to an immersion vessel, after which a plate made of ceramic (200 mm×80 mm×3 mm; hereinafter, referred to as "ceramic plate") that had been washed and then heated to 60° C. was immersed therein. Specifically, once a tip of the ceramic plate was brought into contact with the surface of the liquid coagulant, the ceramic plate was immersed to a position of 18 cm from the tip over a period of 4 seconds, and this immersed state was maintained for 4 seconds before pulling out the ceramic plate over a period of 3 seconds. Then, the liquid coagulant adhering to the surface of the ceramic plate was promptly shaken off, and the surface of the ceramic plate was dried. The thus dried ceramic plate was heated again to 60° C. in preparation for subsequent immersion into the dip molding composition.

(4) Preparation of Cured Film

The above-obtained dip molding composition maintained at room temperature was filtered through a 200-mesh nylon filter and then added to an immersion vessel, after which the above-described 60° C. ceramic plate to which the liquid coagulant had been adhered was immersed therein. Specifically, the ceramic plate was immersed over a period of 6 seconds, maintained for 4 seconds, and then pulled out over a period of 3 seconds. The ceramic plate was held in the air until the dip molding composition no longer dripped, and latex droplets adhering to the tip were lightly shaken off.

The ceramic plate immersed in the dip molding composition was left to stand at 50° C. for 2 minutes or at 80° C. for 2 minutes to prepare a cured film precursor (gelling).

Then, the cured film precursor was leached with 23° C. or 50° C. deionized water for 0.5 minutes, 1 minute, 2 minutes, or 3 minutes.

The resulting films were each dried at 70° C. for 5 minutes (precuring) and subsequently heat-cured mainly at 130° C. for 30 minutes (curing).

The thus obtained cured film were each cleanly peeled off from the ceramic plate and stored at a temperature of 23° C.±2° C. and a humidity of 50%±10% until being subjected to the physical property tests.

4. Analysis and Evaluation of Cured Films

The tensile strength and the fatigue durability were measured for each of the above-obtained cured films to judge whether or not each cured film could be used in practice. In addition, the metal content (Zn, Ca and K) in each cured film was quantitatively analyzed to examine its relationship with the fatigue durability. These measurements were performed by the following respective methods.

(Fatigue Durability)

Figure 3:
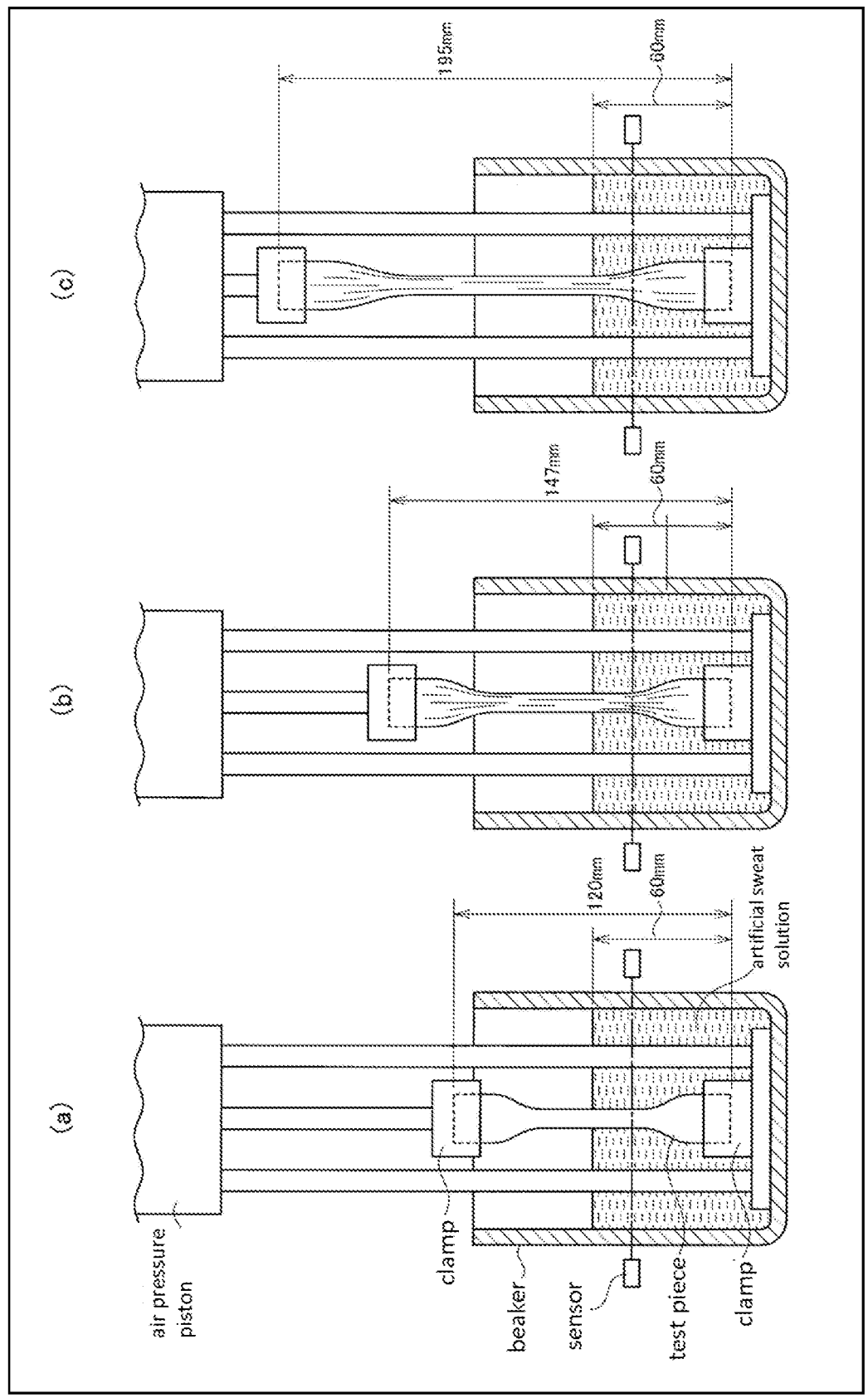
FIG. 3 provides cross-sectional views that schematically illustrate one example of a fatigue durability test apparatus.

A #1 dumbbell test piece according to JIS K6251 was cut out from each cured film and immersed in an artificial sweat solution (which contained 20 g of sodium chloride, 17.5 g of ammonium chloride, 17.05 g of lactic acid and 5.01 g of acetic acid in 1 liter and whose pH had been adjusted to 4.7 with sodium hydroxide), and the fatigue durability was evaluated using the durability test apparatus illustrated in FIG. 3.

Using the apparatus illustrated in FIG. 3, the dumbbell test piece of 120 mm in length was held by a fixed chuck and a mobile chuck at 15 mm away from each of the two ends, and the test piece was immersed in the artificial sweat solution up to 60 mm from the lower end on the side of the fixed chuck. After moving the mobile chuck to a minimum position (relaxed state) where the test piece had a length of 147 mm (123%) and maintaining the mobile chuck at this position for 11 seconds, the mobile chuck was moved to a maximum position (elongated state) where the test piece had a length of 195 mm (163%) and then moved back to the minimum position (relaxed state) in 1.8 seconds. A cycle test was performed taking these moving operations as one cycle. The fatigue durability time (minutes) was determined by multiplying the duration of each cycle, which was 12.8 seconds, by the number of the cycles until the test piece was torn.

(Tensile Strength)

From each cured film, a #5 dumbbell test piece according to ASTM D412 (according to JIS K6251:2017) was cut out, and the tensile strength (MPa) thereof was measured using a TENSILON universal tensile tester RTC-1310A manufactured by A&D Co., Ltd. at a test rate of 500 mm/min, a chuck distance of 75 mm, and a gauge mark distance of 25 mm.

(Quantitative Analysis of Calcium, Potassium and Zinc)

The metal content in each cured film was quantified by atomic absorption spectrophotometry. A concrete quantification method is as described above in the section of "MODE FOR CARRYING OUT THE INVENTION".

5. Various Experiments (1) Experiment 1

In this experiment, it was judged whether or not the glove physical properties (fatigue durability and tensile strength) satisfied the performance required for a glove when the leaching time was 0.5 to 3 minutes at a leaching temperature of 50° C. or 23° C. It is noted here that the term "leaching temperature" means the temperature of water used for leaching. Further, the term "leaching time" means a period in which each cured film precursor was washed with water (a period in which the cured film precursor was kept in contact with water (specifically, immersed in water)).

As shown in Tables 1A and 1B below, the film thickness was changed within a range of 50 to 100 μm, and the resulting tendency was visually checked. The cured film preparation conditions were set in accordance with the above-described preparation procedures. With regard to whether the glove physical properties were satisfactory or not, an evaluation of "G: good" was given when the target glove physical properties (1) and (2), which are described above in the section of "MODE FOR CARRYING OUT THE INVENTION", were both satisfied, or an evaluation of "F: failure" was given otherwise.

TABLE 1A

| | At a leaching temperature of 50° C. | | | | | | | | | | |
|---|---|---|---|---|---|---|---|---|---|---|---|
| | | | | | | | | | | Glove physical properties | |
| | Film thickness | | Process conditions | | | Metal content in cured film (% by weight) | | | | Fatigue durability | Tensile strength | Evaluation |
| Experiment No. | μm | pH | Gelling °C. | Curing °C. | Leaching minutes | Zn | Ca | K | Ca + K | minutes | MPa | G or F |
| (1) | 50-60 | 10 | 50 | 130 | 0.5 | — | — | — | — | 38 | 36.2 | F |
| | | | | | 1 | — | — | — | — | 126 | 37.6 | F |
| | | | | | 2 | — | — | — | — | 403 | 41.2 | G |
| | | | | | 3 | — | — | — | — | 337 | 39.9 | G |
| (2) | 60-70 | 10 | 50 | 130 | 0.5 | — | — | — | — | 42 | 38.0 | F |
| | | | | | 1 | — | — | — | — | 139 | 40.2 | F |
| | | | | | 2 | — | — | — | — | 467 | 41.2 | G |
| | | | | | 3 | — | — | — | — | 362 | 39.4 | G |
| (3) | 70-80 | 10 | 50 | 130 | 0.5 | 0.76 | 1.16 | 0.12 | 1.28 | 42 | 40.4 | F |
| | | | | | 1 | 0.75 | 1.15 | 0.08 | 1.23 | 133 | 43.4 | F |
| | | | | | 2 | 0.77 | 0.92 | 0.01 | 0.93 | 561 | 44.5 | G |
| | | | | | 3 | 0.74 | 0.82 | <0.01 | 0.82 | 461 | 45.7 | G |
| (4) | 90-100 | 10 | 50 | 130 | 0.5 | 0.76 | 1.38 | 0.29 | 1.67 | 119 | 41.0 | F |
| | | | | | 1 | 0.81 | 1.19 | 0.08 | 1.27 | 193 | 44.4 | F |
| | | | | | 2 | 0.84 | 1.04 | 0.02 | 1.06 | 822 | 49.1 | G |
| | | | | | 3 | 0.78 | 0.91 | 0.02 | 0.93 | 1305 | 50.6 | G |
| (5) | 90-100 | 10 | 80 | 120 | 0.5 | 0.73 | 1.42 | 0.27 | 1.69 | 130 | 41.8 | F |
| | | | | | 1 | 0.72 | 1.22 | 0.19 | 1.41 | 236 | 45.9 | F |
| | | | | | 2 | 0.79 | 0.94 | 0.04 | 0.98 | 950 | 47.2 | G |
| | | | | | 3 | 0.81 | 0.88 | 0.04 | 0.92 | 528 | 46.2 | G |
| (6) | 50-60 | 10.5 | 50 | 130 | 0.5 | 0.78 | 1.20 | 0.35 | 1.55 | 44 | 36.0 | F |
| | | | | | 1 | 0.81 | 1.08 | 0.18 | 1.26 | 108 | 39.6 | F |
| | | | | | 2 | 0.80 | 1.03 | 0.08 | 1.11 | 380 | 41.1 | G |
| | | | | | 3 | 0.82 | 1.00 | 0.04 | 1.04 | 315 | 42.4 | G |

Note

1) Experiment Nos. (1) to (4) were conducted under the same conditions, while the temperature was changed in the gelling step and the curing step for Experiment No. (5). In Experiment No. (6), the pH of the dip molding composition was changed to 10.5.

Note

2) In Experiment Nos. (1) and (2), the metal content was not quantitatively analyzed.

TABLE 1B

At leaching temperature of 23° C.

| Experiment No. | Film thickness μm | pH | Process conditions Gelling °C. | Curing °C. | Leaching minutes | Metal content in cured film (% by weight) Zn | Ca | K | Ca + K | Glove physical properties Fatigue durability minutes | Tensile strength MPa | Evaluation G or F |
|---|---|---|---|---|---|---|---|---|---|---|---|---|
| (7) | 70-80 | 10 | 50 | 130 | 0.5 | 0.69 | 1.33 | 0.35 | 1.68 | 30 | 39.2 | F |
|  |  |  |  |  | 1 | 0.72 | 1.16 | 0.13 | 1.29 | 65 | 42.3 | F |
|  |  |  |  |  | 2 | 0.76 | 1.04 | 0.05 | 1.09 | 130 | 44 | F |
|  |  |  |  |  | 3 | 0.75 | 0.94 | 0.03 | 0.97 | 300 | 45.4 | G |
| (8) | 90-100 | 10 | 50 | 130 | 0.5 | 0.72 | 1.51 | 0.46 | 1.97 | 44 | 42.1 | F |
|  |  |  |  |  | 1 | 0.79 | 1.22 | 0.19 | 1.41 | 101 | 43.1 | F |
|  |  |  |  |  | 2 | 0.75 | 1.13 | 0.12 | 1.25 | 279 | 43.7 | G |
|  |  |  |  |  | 3 | 0.83 | 1.09 | 0.05 | 1.14 | 442 | 47.5 | G |
| (9) | 90-100 | 10 | 80 | 120 | 0.5 | 0.73 | 1.79 | 0.50 | 2.29 | 57 | 35.9 | F |
|  |  |  |  |  | 1 | 0.74 | 1.64 | 0.35 | 1.99 | 69 | 41.3 | F |
|  |  |  |  |  | 2 | 0.76 | 1.33 | 0.22 | 1.55 | 89 | 42.4 | F |
|  |  |  |  |  | 3 | 0.77 | 1.03 | 0.06 | 1.09 | 425 | 44.4 | G |
| (10) | 50-60 | 10.5 | 50 | 130 | 0.5 | 0.73 | 1.39 | 0.42 | 1.81 | 33 | 35.6 | F |
|  |  |  |  |  | 1 | 0.76 | 1.26 | 0.27 | 1.53 | 54 | 37.1 | F |
|  |  |  |  |  | 2 | 0.78 | 1.17 | 0.14 | 1.31 | 119 | 37.2 | F |
|  |  |  |  |  | 3 | 0.80 | 1.05 | 0.12 | 1.17 | 215 | 38.7 | F |

Note
1) Experiment Nos. (7) and (8) were conducted under the same conditions as Experiment Nos. (1) to (4), while the temperature was changed in the gelling step and the curing step for Experiment No. (9). In Experiment No. (10), the pH of the dip molding composition was changed to 10.5.

The findings of the above-described Experiment 1 are discussed below.

The production of a glove by a dip molding method is carried out at a constant line speed and, therein, the time allocated to the leaching step is usually 4 minutes at the longest.

With regard to the temperature of water in a leaching vessel (leaching temperature), comparing those cases shown in Table 1A where the leaching temperature was 50° C. and those cases shown in Table 1B where the leaching temperature was 23° C., it was found that a leaching temperature of 50° C. imparted the cured films with higher fatigue durability even with a short leaching time. In addition, examining FIG. 1A, it was found that the fatigue durability of each cured film was abruptly improved once the leaching time exceeded 1 minute.

As a result, it was found that, by performing the leaching step for 1.5 minutes or longer with the water temperature being increased to 40 to 70° C. or so, the resulting 50 to 100-μm cured films were imparted with sufficient fatigue durability, which was common to both cases where pH was 10.0 ((1) to (5)) and 10.5 (6).

As for the leaching temperature, a leaching temperature of 50° C. can impart the resulting cured films with higher fatigue durability than a leaching temperature of 23° C. In addition, it was found that the difference in the leaching temperature has a greater effect on the difference in the fatigue durability of the cured films as the film thickness increases.

Next, the amounts of Zn, Ca and K contained in each of the cured films shown in Tables 1A and 1B were quantified. First, with regard to Zn, the amount thereof was found to be hardly reduced even after the leaching step.

On the other hand, it was found that Ca and K had eluted out at the point when the cured film precursors were subjected to the leaching step. The relationships between the total content of Ca and K in the cured films and the fatigue durability of the cured films were checked.

Figure 2A:
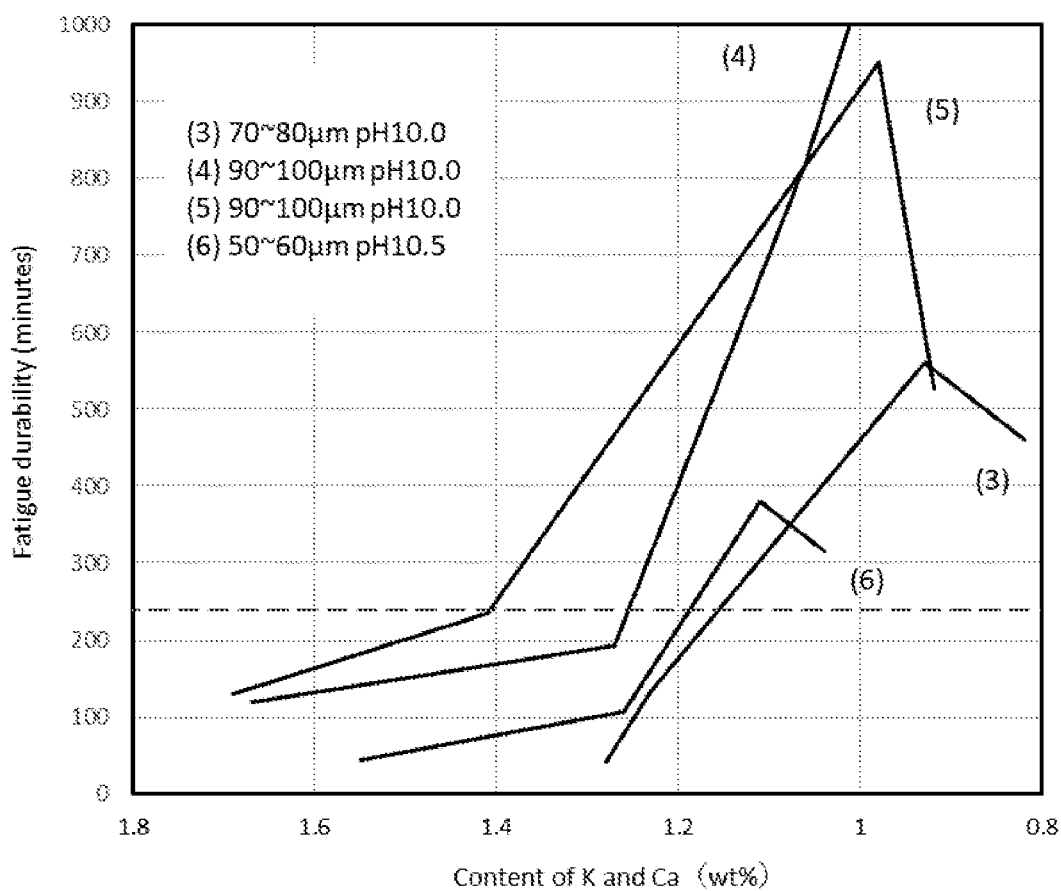
FIG. 2A is a graph showing the relationships between the total content of potassium and calcium in cured films and the fatigue durability of the cured films at a leaching temperature of 50° C.
Figure 2B:
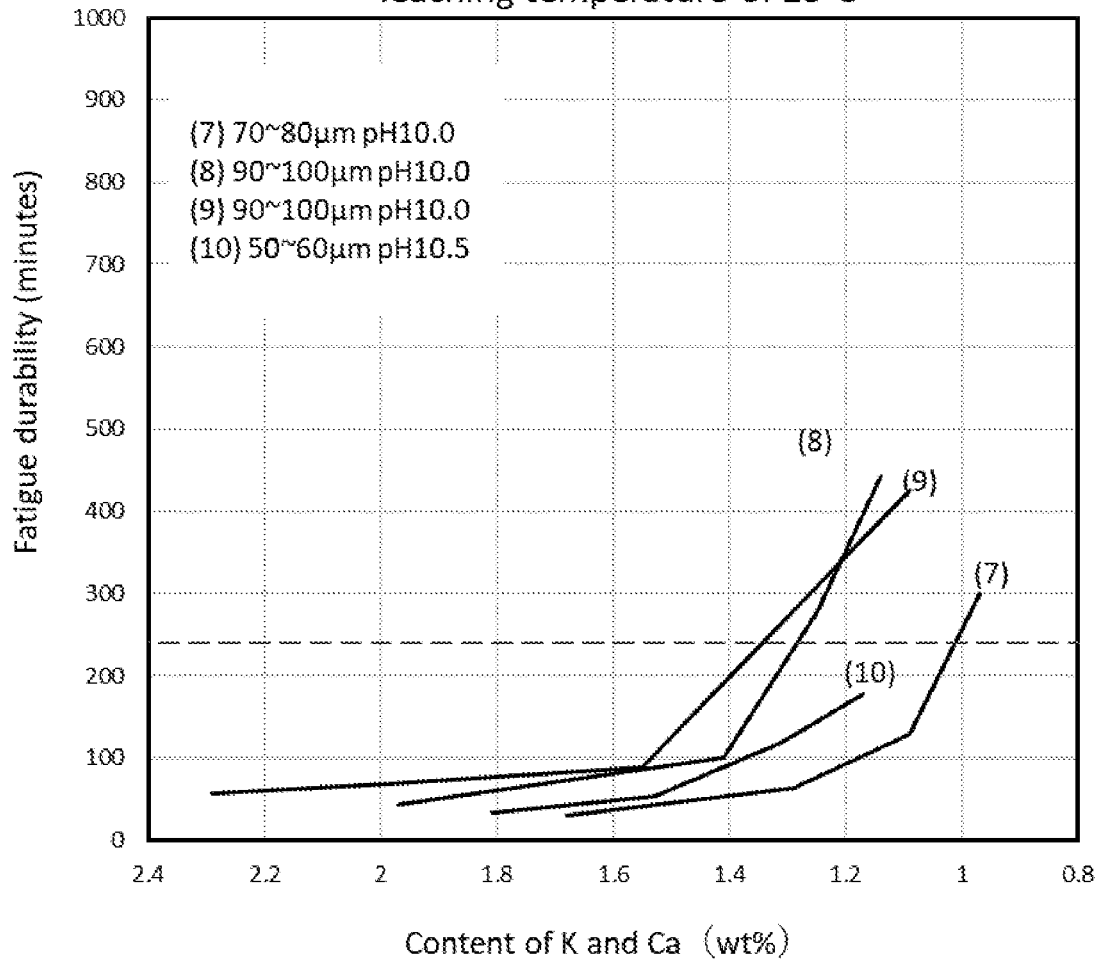
FIG. 2B is a graph showing the relationships between the total content of potassium and calcium in cured films and the fatigue durability of the cured films at a leaching temperature of 23° C.

Referring to FIG. 2A, it was found that, although the thicker cured films had a certain level of fatigue durability even when the total content of Ca and K was large, the fatigue durability of the cured films was improved as the total content of Ca and K was reduced.

The total content of K and Ca at which the fatigue durability is abruptly improved varies depending on the film thickness of each cured film. Examining the 50 to 100-μm cured films as a whole, it was found that the cured films had sufficient fatigue durability when the total content of K and Ca was below 1.15% by weight.

(2) Experiment 2

In this experiment, sodium hydroxide, which is an alkali metal hydroxide, was used as a pH modifier and compared against potassium hydroxide.

It is noted here, however, that sodium hydroxide remaining in a glove can irritate the skin and is thus seldom used in the glove production.

TABLE 2

| Experiment No. | Film thickness | pH modifier |  | Process conditions Gelling | Curing | Leaching | Glove physical properties Fatigue durability | Tensile strength |
|---|---|---|---|---|---|---|---|---|
| 11 | 50 to 60 μm | KOH | pH 10.0 | 80° C., 2 minutes | 120° C., 30 minutes | 50° C., 2 minutes | 206 minutes | 36.8 MPa |
|  |  | NaOH |  |  |  |  | 194 minutes | 34.9 MPa |

(3) Experiment 3

The biggest problem in the use of a compound that can generate ammonia, such as ammonium hydroxide, as a pH modifier is that ammonia is volatile. The existing glove production equipments are mostly open systems, and the process from the aging step to the dipping step may require up to about 5 days. A reduction in the pH of a dip molding composition with time due to volatilization of ammonia was checked as follows.

The dip molding composition was the same as the one used in Example 1, except that ammonium hydroxide (NH$_3$) was used as a pH modifier.

In the experiments shown below, a case where the stirring vessel (beaker) was wrapped with a polyvinylidene chloride film and a case where the stirring vessel was not wrapped were compared. The results thereof are shown in Table 3A.

TABLE 3A

| pH modifier | Wrapping of stirring vessel | pH value of dip molding composition after lapse of time | | | |
|---|---|---|---|---|---|
| | | 0 hour | 24 hours | 48 hours | 72 hours |
| Ammonium hydroxide (NH$_3$) | yes | 10.03 | 9.98 | 9.96 | 9.92 |
| | no | 10.01 | 9.29 | 8.92 | 8.64 |

Examining the results shown above, the pH dropped to 8.64 when the stirring vessel was not wrapped (open system), and this is believed to be the cause of a reduction in the glove fatigue durability.

Accordingly, in order to use ammonium hydroxide as a pH modifier, in the case of an open system, it is necessary to either maintain the pH by adding an ammonium compound such as ammonium hydroxide or reconstruct the equipment to be a closed system. Moreover, in an open system, the irritating odor of ammonia and corrosion of equipment are particularly disliked.

Next, cured films were prepared from the above-described dip molding composition that had been stirred for 24 hours (with or without wrapping), and the physical properties of the cured films were measured. The conditions for the preparation of these cured films were the same as in Experiment 1. The results thereof are shown in Table 3B.

TABLE 3B

| Experiment No. | Film thickness (μm) | Dip molding composition (after 24 hours) | | Glove physical properties | |
|---|---|---|---|---|---|
| | | Wrapping of stirring vessel | pH | Fatigue durability (minutes) | Tensile strength (MPa) |
| 12 | 50 to 60 | yes | 9.98 | 198 | 32.3 |
| | | no | 9.29 | 86 | 29.8 |

In the case of no wrapping (open system), it was confirmed that the pH dropped to 9.29 even in the dip molding composition after 24 hours, and that the fatigue durability was greatly reduced as well.

(4) Experiment 4
Examination of Polycarbodiimide

Tests were conducted to verify the effect of a difference in the average particle size of micelles of the polycarbodiimide contained in the dip molding composition on the change in viscosity with time after the preparation of the dip molding composition. Specifically, it was verified whether or not the use of V-02-L2 (manufactured by Nisshinbo Chemical Inc., average particle size of micelles: 11.3 nm, number of carbodiimide functional groups per molecule: 9.4) as a polycarbodiimide 1 and the use of E-03A (manufactured by Nisshinbo Chemical Inc., average particle size of micelles: 68.3 (n=2), number of carbodiimide functional groups per molecule: 9.3) as a polycarbodiimide 2 resulted in a difference in the storage stability (pot life) of dip molding compositions.

It is noted here that the polycarbodiimide content in each dip molding composition was 3.0 phr. Further, 120H manufactured by LG Chem, Ltd. was used as a latex. The pH was adjusted to be 10 with a basic compound, and each dip molding composition was continuously stirred at 120 rpm under normal temperature.

The results thereof are shown in Table 4 below. In Table 4, the values shown under "0" (number of elapsed days) indicate the viscosity measured at 1 hour after the preparation of each composition.

TABLE 4

| Crosslinking agent | | Number of elapsed days | | | | | |
|---|---|---|---|---|---|---|---|
| | | 0 | 1 | 2 | 3 | 5 | 7 |
| E-03A | Solution viscosity (mPa · s) | 15 | 17 | 19 | 20 | 24 | 52 |
| V-02-L2 | | 12 | 12 | 12 | 12 | 13 | 13 |

From the results shown in Table 4, it was found that the polycarbodiimide 1 having a small average particle size of micelles caused hardly any change in the viscosity of the dip molding composition even with a lapse of time after the preparation.

(5) Experiment 5

To a latex manufactured by LG Chem, Ltd. (LN120H, solid concentration: 45% by weight), the polycarbodiimide (V-02-L2) used in Experiment 4 was added in an amount of 0.5 phr or 3.0 phr, and the resultants were stirred for 3 hours. Thereafter, from each of the thus obtained mixtures, a prescribed amount was extracted at the points of 3 days, 27 days and 60 days, and the pH thereof was adjusted with a basic compound to prepare dip molding compositions. Further, cured films were prepared by the same procedures as in the above-described experimental examples (however, the gelling step was performed at 50° C. for 2 minutes, the leaching step was performed at 50° C. for 5 minutes, and the curing step was performed at 135° C. for 10 minutes), and the physical properties of the thus obtained cured films were measured. The results thereof are shown in Table 5.

TABLE 5

| Standing duration with mixing (day) | Amount of added polycarbodiimide (phr) | ASTM | | |
|---|---|---|---|---|
| | | Tensile strength (MPa) | Elongation (%) | Fatigue durability (min) |
| 3 | 0.5 | 39 | 600 | 357 |
| | 3 | 38 | 580 | >1,500 |
| 27 | 0.5 | 37 | 620 | 411 |
| | 3 | 37 | 580 | >1,500 |
| 60 | 0.5 | 39 | 610 | 488 |
| | 3 | 38 | 590 | >1,500 |

As shown in Table 5, when the polycarbodiimide 1 was used as a crosslinking agent, the cured films produced from a dip molding composition with a long lapse of time after the mixing with the latex had physical properties that were equivalent to those of the cured films produced from a dip molding composition with a short lapse of time after the preparation. This indicates that a crosslinking agent with such average particle size and number of carbodiimide functional groups per molecule of the polycarbodiimide 1 has excellent stability with time.

The invention claimed is:

1. A method of producing a glove, the method comprising:
   (1) a step of allowing a coagulant containing calcium ions to adhere to a glove forming mold;
   (2) a dispersion step of stirring a dip molding emulsion;
   (3) a dipping step of immersing the glove forming mold, to which the coagulant has adhered in the step (1), in the dip molding emulsion to allow the dip molding emulsion to aggregate and adhere to the glove forming mold;
   (4) a gelling step of leaving the glove forming mold, to which the dip molding emulsion has adhered, to stand at a temperature of 40° C. to 120° C. for 20 seconds to 4 minutes without drying to form a cured film precursor on the glove forming mold;
   (5) a leaching step of washing the cured film precursor thus formed on the glove forming mold with 40° C. to 70° C. water for 1.5 minutes to 4 minutes to remove excess calcium and alkali metal from the cured film precursor;
   (6) a beading step of making a roll in a cuff portion of the resulting glove; and
   (7) a curing step of heating and drying the cured film precursor subjected to the beading step at 100° C. to 140° C. for 15 minutes to 30 minutes so as to obtain a cured film having a total content of alkali metal and calcium of 1.15% by weight or less at a film thickness of 50 μM to 100 μM, having a tensile strength of 20 MPa or higher as determined by an ASTM test method and exhibiting a fatigue durability of 240 minutes or longer in a fatigue durability test wherein the steps (3) to (7) are performed in the order mentioned, and the dip molding emulsion comprises, at least:

an elastomer consisting essentially of a (meth)acrylonitrile-derived structural unit, an unsaturated carboxylic acid-derived structural unit, and a butadiene-derived structural unit in a polymer main chain;

polycarbodiimide crosslinker molecules comprising at least one polycarbodiimide containing a hydrophilic segment at at least one end of the polycarbodiimide molecules wherein a number-average molecular weight of the polycarbodiimide is from 500 to 5000;

a pH adjuster for the polycarbodiimide crosslinker molecules consisting essentially of an alkali metal hydroxide;

optionally, zinc oxide and/or an aluminum complex as a metal crosslinking agent in an amount of 0.2% by weight to 7.0% by weight with respect to the total solid content of the dip molding emulsion; and water, wherein the elastomer contains the (meth)acrylonitrile-derived structural unit in an amount of 20% by weight to 40% by weight, the unsaturated carboxylic acid-derived structural unit in an amount of 1% by weight to 10% by weight, and the butadiene-derived structural unit in an amount of 50% by weight to 75% by weight, the polycarbodiimide is added in an amount larger than 0.2% by weight but 4.0% by weight or less with respect to a total solid content of the dip molding emulsion, and the dip molding emulsion has a pH of 9.5 to 10.5.

2. The method of producing a glove according to claim 1, wherein the steps (3) and (4) are performed at least twice.

3. The method according to claim 1, wherein the alkali metal hydroxide is potassium hydroxide.

4. The method according to claim 1, wherein the number of carbodiimide functional groups is 5 or more per molecule of the polycarbodiimide, and micelles formed from the polycarbodiimide have an average particle size of 5 nm to 30 nm.

5. The method according to claim 1, wherein the hydrophilic segments of at least some of the polycarbodiimide molecules are capped with a capping agent.

6. The method according to claim 1, wherein a carbodiimide equivalent of the polycarbodiimide is in a range of 260 to 440.

7. The method according to claim 1, wherein the number-average molecular weight of the polycarbodiimide is from 1000 to 4000.

* * * * *